United States Patent [19]
Ohsuka et al.

[11] Patent Number: 5,715,049
[45] Date of Patent: Feb. 3, 1998

[54] LIGHT MEASURING APPARATUS FOR QUANTIFYING PHOTONS

[75] Inventors: Shinji Ohsuka; Hisayoshi Takamoto, both of Hamakita, Japan

[73] Assignee: Laboratory of Molecular Biophotonics, Shizuoka, Japan

[21] Appl. No.: 748,837

[22] Filed: Nov. 14, 1996

[30] Foreign Application Priority Data

| Nov. 15, 1995 | [JP] | Japan | 296902/1995 |
| Jun. 7, 1996 | [JP] | Japan | 146220/1996 |

[51] Int. Cl.$^6$ ............................................. G01J 1/46
[52] U.S. Cl. ........................ 356/215; 356/213; 356/218; 356/230
[58] Field of Search ..................... 356/215, 213, 356/218, 222, 236, 230

[56] References Cited

U.S. PATENT DOCUMENTS

| 4,600,306 | 7/1986 | Hara et al. | 356/317 |
| 4,652,751 | 3/1987 | Rundt et al. | 250/252.1 |
| 4,737,029 | 4/1988 | Yabusaki et al. | 356/225 |
| 4,855,930 | 8/1989 | Chao et al. | 364/497 |
| 5,561,287 | 10/1996 | Turner et al. | 250/208.2 |

FOREIGN PATENT DOCUMENTS

| 2733061 | 2/1978 | Germany. |
| 205522 | 12/1983 | Germany. |
| 3329516 | 2/1985 | Germany. |
| 4420572 | 12/1995 | Germany. |
| 658912 | 12/1986 | Switzerland. |
| 2268803 | 1/1994 | United Kingdom. |
| 2186075 | 8/1987 | WIPO. |

OTHER PUBLICATIONS

Gratton et al., "Microprocessor–Controlled Photon–Counting Spectrofluorometer", Rev. Sci. Instrum. vol. 54, No. 3, Mar. 1983, pp. 294–299.

Hungerford et al., "Single–Photon Timing Detectors for Fluorescence Lifetime Spectroscopy", Meas. Sci. Technol. vol. 7, 1996, pp. 121–135.

Mandzhukov et al., "Weak–Scintillation Light Yield Determination", Instruments and Experimental Techniques (May–Jun. 1987), vol. 30, No. 3, Pt. 2, pp. 657–661. (English Abstract).

Cuby et al., "High Precision Photometry: The Electron Bombarded Diode Approach", Astronomy and Astrophysics (Sept. 1988), vol. 203, No. 1, pt. 1, pp. 203–206. (English Abstract).

Haselgrove et al., "A Single–Photon Counting Fluorescence Decay–Time Spectrometer", Journal of Physics E: Scientific Instruments 1977, vol. 10, pp. 1044–1049.

(List continued on next page.)

*Primary Examiner*—Frank G. Font
*Assistant Examiner*—Reginald A. Ratliff
*Attorney, Agent, or Firm*—Leydig, Voit & Mayer, LTD.

[57] ABSTRACT

When incident light is incident to a photodetector, photoelectrons are emitted therefrom and then multiplied to output an electric current signal. This current signal is integrated over a predetermined period of time in an integrator to be converted to a voltage signal. This voltage signal is converted to a digital signal by an AD converter. This digital signal is supplied to a histogramming memory, which generates a pulse height distribution of voltage signal. Based on a pulse height distribution $N(h)$ generated with incidence of measurement-object light to the photodetector, a pulse height distribution of single photoelectron events $p_1(h)$ generated by a generator of pulse height distribution of single photoelectron events, and pulse height distributions of k-photoelectron events $p_k(h)$ ($k=2, 3, \ldots$) calculated and generated in a generator of pulse height distributions of k-photoelectron events, an estimating unit estimates a distribution of numbers of photoelectrons emitted with incidence of the measurement-object light to the photodetector, and thereby obtains the intensity of the measurement-object light.

19 Claims, 24 Drawing Sheets

OTHER PUBLICATIONS

Wiinaendts van Resandt et al., "Double Beam Fluorescence Life-time Spectrometer with Subnanosecond Resolution: Application to Aqueous Tryptophan", Rev. Sci. Instrum. vol. 53, No. 9, Sept. 1982, pp. 1392–1397.

"Handbook of Optics"; Optical Society of America, vol. II pp. 20.5–20.13.

Engstrom, Ralph W.; "Photomultiplyier Handbook", RCA Corp., pp. 160–176, 1980.

Birch et al.; "Time-Domain Fluorescence Spectroscopy Using Time-Correlated Single-Photon Counting", pp. 1–15, 1991.

Cushman et al., "A Multichannel Avalanche Photodiode Phototube for Calorimetry", Nuclear Physics B, pp. 35–39, 1995.

Hirano et al., "Fundamental Investigation of Vacuum PD Tube", IEEE Transactions on Nuclear Science, vol. 41, pp. 719–724, 1994.

Shawn J. Fagen; "Vacuum avalanche photodiodes can count single photons", Laser Focus World, pp. 125–132, Nov. 1993.

Cushman et al., "A photomultiplier tube incorporating an avalanche photodiode", Nuclear Instruments & Methods in Physics Research, pp. 381–390, 1993.

Clements et al., "Test results of the first Proximity Focused Hybrid Photodiode Detector prototypes", Nuclear Instruments and Methods in Physics Research, pp. 93–99, 1993.

Johansen et al.; "Operational Characteristics of an electron-bombarded silicon-diode photomultiplier tube", Nuclear Instruments & Methods in Physics Research, pp. 295–298, 1993.

DeSalvo et al., "First results on the hybrid photodiode tube"; Nuclear Instruments & Methods in Physics Research, pp. 375–384, 1992.

LIGHT MEASURING APPARATUS FOR QUANTIFYING PHOTONS

BACKGROUND OF THE INVENTION

1. Field of the Invention

The present invention relates to a light measuring apparatus for counting the number of photons of incident light, and more particularly, to a light measuring apparatus for quantifying photons used, for example in the field of biochemistry or the like, for counting the number of photons of fluorescence radiated from a sample excited by a pulsed light source and quantitatively measuring the number of fluorescent molecules in the sample.

2. Related Background Art

For quantitatively measuring an amount of a fluorescent substance (or fluorescent molecules) in a sample, the sample is irradiated by excitation light and the intensity of fluorescence occurring from the fluorescent substance is measured. A typical device having been used heretofore for such measurement is a fluorophotometer, for example, using a xenon lamp as a light source and a photomultiplier tube as a fluorescence detector. In general, the xenon lamp is lighted not pulsatively but continuously and the photomultiplier tube receives the fluorescence generated by the fluorescent substance to continuously output an output current according to the intensity of the fluorescence. The fluorescence intensity is measured in this manner and the amount of the fluorescent material is determined based on the value of the output current from the photomultiplier tube.

However, in the cases where the amount of the fluorescent substance in the sample is very small and the fluorescence intensity, depending upon the intensity of the excitation light from the xenon lamp, is below the detection limit, the above fluorophotometer cannot be used. In such cases, a laser light source is used as an excitation light source. Also in this case, similarly as in the above case, the photomultiplier tube measures the intensity of fluorescence generated by the fluorescent substance in the sample excited by laser light and the amount of the fluorescent substance is determined based on the output value from the photomultiplier tube.

Examples of methods for exciting the fluorescent substance in the sample by pulsed laser light emitted from the laser light source and quantitatively determining the amount of the fluorescent substance in the sample from the measurement results of fluorescence intensity, that is, from the output value from the photomultiplier tube include the so-called photon counting method utilizing a count value of output pulses from the photomultiplier tube and a method utilizing pulse height values of the output pulses from the photomultiplier tube.

Further, determination methods by the photon counting method include a method for making such estimation that the fluorescent substance is present in proportion to the count value and a method for estimating the amount of the fluorescent substance from the probability $p(0)$ that the number of photoelectrons emitted from a photoelectric conversion surface of the photomultiplier tube with irradiation of the sample by a pulse of the laser light is zero, which is the so-called zero probability method.

By the latter zero probability method, supposing a distribution of photoelectrons in the photoelectric conversion surface can be expressed as a Poisson distribution, the mean value $\lambda$ of photoelectron numbers is estimated by the following equation.

$$\lambda = -\log(p(0)) \tag{1}$$

Then the amount of the fluorescent substance is determined as an amount proportional to the mean value $\lambda$.

SUMMARY OF THE INVENTION

It is an object of the present invention to provide a light measuring apparatus that can measure quantities of light with accuracy as estimating the mean value $\lambda$ at high accuracy even if the probability of emission of two or more photoelectrons in the photoelectric conversion surface of the photodetector is high or even if the mean value $\lambda$ of numbers of photoelectrons emitted from the photoelectric conversion surface of the photodetector is large.

A light measuring apparatus of the present invention comprises: (a) a photodetector for emitting photoelectrons in a number according to a photoelectron number distribution depending upon a number of photons of incident light, multiplying the photoelectrons, and outputting a current signal; (b) integrating means for integrating the current signal to convert the current signal to a voltage signal and outputting the voltage signal as a pulse height value of one event; (c) first generating means for collecting a pulse height value of each event and generating a pulse height distribution ($N(h)$; $h$ is pulse height values) of number of event against pulse height value; (d) second generating means for generating a pulse height distribution of single photoelectron events ($p_1(h)$), based on a pulse height distribution ($N_1(h)$) generated by the first generating means in a collection mode of single photoelectron events in each of which a number of photoelectrons emitted in said photodetector is substantially at most one; (e) third generating means for recursively calculating values as defined below, based on the pulse height distribution of single photoelectron events ($p_1(h)$), $$p_k(h) = \int_0^h (p_{k-1}(j) \cdot p_1(h-j))dj$$

and thereby generating pulse height distributions of k-photoelectron events ($p_k(h)$) in each of which a number of photoelectrons emitted from the photodetector is k ($2 \leq k \leq k_{max}$); and (f) estimating means for estimating the photoelectron number distribution for a case wherein measurement-object light is incident to the photodetector, based on a pulse height distribution ($N(h)$) generated by the first generating means when the measurement-object light is incident to the photodetector in a normal measurement mode, the pulse height distribution of single photoelectron events already obtained ($p_1(h)$), and the pulse height distributions of k-photoelectron events already obtained ($p_k(h)$), thereby obtaining an intensity of the measurement-object light.

Prior to the normal light measurement, this light measuring apparatus collects single photoelectron events in each of which the number of photoelectrons emitted in the photodetector is at most one. It is theoretically impossible to generate only single photoelectron events, but it is possible to make a probability of occurrence of single photoelectron events overwhelmingly dominant by setting the light quantity of light incident to the photodetector to a very small quantity.

First, when the light is incident to the photodetector in the state in which the very weak light is incident to the photodetector, at most one photoelectron is emitted in most cases. Then the photoelectron is multiplied in the photodetector and an electric current signal is output therefrom. This current signal is integrated over a predetermined period of time by the integrating means to become a voltage signal of one event. Since the number of photoelectrons emitted in the photodetector in accordance with one event (i.e., during the predetermined period of time) is at most one in the most cases, as described above, the voltage signal becomes a value according to a single photoelectron event in the most cases. The voltage value of the voltage signal of each event is collected as a pulse height value of each event by the first generating means. The first generating means generates the pulse height distribution $N_1(h)$ based on the pulse height values collected.

Next, the second generating means takes in the pulse height distribution $N_1(h)$ generated by the first generating means and eliminates the noise in the low-peak-height portion and zero-photoelectron events, based on the pulse height distribution $N_1(h)$, thereby generating the pulse height distribution $p_1(h)$ of single photoelectron events.

Then the third generating means takes in the pulse height distribution $p_1(h)$ of single photoelectron events generated by the second generating means, and recursively calculating the following values, based on the pulse height distribution $p_1(h)$, $$p_k(h) = \int_0^h (p_{k-1}(j) - p_1(h-j))\, dj$$

and thereby generating the pulse height distributions of k-photoelectron events $p_k(h)$ in each of which the number of photoelectrons emitted from the photodetector is k ($2 \leq k \leq k_{max}$).

After obtaining the pulse height distributions $p_i(h)$ of events in each of which the number of photoelectrons emitted from the photodetector is i ($1 \leq i \leq k_{max}$) in this way, measurement of normal measurement-object light is carried out. For measuring the normal measurement-object light, first, the measurement-object light is incident to the photodetector to emit photoelectrons. The photoelectrons thus generated are multiplied in the photodetector to output an electric current signal. This current signal is integrated over the predetermined period of time by the integrating means to become a voltage signal of one event. The first generating means collects the voltage value of the voltage signal of each event as a pulse height value of each event. The first generating means generates the pulse height distribution $N(h)$ based on the pulse height values collected.

Next, the estimating means collects the pulse height distribution $N(h)$ generated by the first generating means and obtains the pulse height distributions $p_i(h)$ from the third generating means. Then, based on the pulse height distribution $N(h)$ and pulse height distributions $p_i(h)$, the estimating means estimates the photoelectron number distribution in one event when the measurement-object light is incident to the photodetector.

Then the intensity of the measurement-object light is obtained from the photoelectron number distribution in one event estimated upon incidence of measurement-object light.

According to the knowledge of the inventor obtained as the results of research, for example, the number of photoelectrons emitted from the photoelectric conversion surface of a photomultiplier tube per irradiation of sample with a pulse of laser light is dependent on the photoelectron number distribution according to the intensity of incident light. Let $p(1)$ be a probability that the number of photoelectrons emitted in accordance with this photoelectron number distribution is 1 and $p(x \geq 2)$ be a probability that the number is 2 or more. The photoelectron number distribution in the photoelectric conversion surface is assumed to be a Poisson distribution. In this case, for example, if the mean value $\lambda$ of numbers of photoelectrons emitted from the photoelectric conversion surface when the photomultiplier tube receives the fluorescence generated from the fluorescent substance excited by a pulse of pulsed laser light is over 0.1, $p(x \geq 2)/p(1)$ becomes 5 or more %. Since greater $p(x \geq 2)/p(1)$ makes deviation larger from the proportional relation of the quantity of fluorescence incident to the photomultiplier with respect to the count value of output pulse from the photomultiplier tube, determination of quantity of the fluorescent substance from the count value of output pulse from the photomultiplier tube will cause a great error.

The determination method utilizing the zero probability has the following problem. In this determination method, assuming the photoelectron number distribution in the photoelectric conversion surface is a Poisson distribution, the mean value $\lambda$ of photoelectron numbers is estimated by the equation defined below and the amount of the fluorescent substance is determined as assuming it is proportional to this mean value.

$$\lambda = -\log(p(0)) \tag{1}$$

Here, letting N be the number of excitations by the pulsed laser light and n be a count value of output pulses from the photomultiplier tube, there is the following relation.

$$p(0) = 1 - p(x \geq 1) = 1 - n/N \tag{2}$$

Thus, Eq. (1) is transformed as follows.

$$\lambda = -\log(1 - n/N) \tag{3}$$

Also in the case of estimation of the $\lambda$ value by the above equation, as the $\lambda$ value becomes greater (for example, $\lambda > 1.5$), that is, as n approaches N, the estimation error of the $\lambda$ value becomes greater.

In the light measuring apparatus of the present invention, prior to the measurement of normal measurement-object light, the single photoelectron events are collected to obtain the pulse height distribution $p_1(h)$ of single photoelectron events. Then, starting from the pulse height distribution $p_1(h)$, the pulse height distributions $p_k(h)$ of k ($2 \leq k \leq k_{MAX}$)-photoelectron events are calculated in a recursive manner. In this way the pulse height distributions $p_i(h)$ ($1 \leq i \leq k_{MAX}$), which are a kind of calibration data, are obtained.

In the light measuring apparatus of the present invention, after the pulse height distributions $p_i(h)$ ($1 \leq i \leq k_{MAX}$) are obtained as described above, the measurement-object light is made incident to obtain the pulse height distribution $N(h)$ by collecting events concerning the measurement-object light. Then estimated from the pulse height distribution $N(h)$ with reference to the pulse height distributions $p_i(h)$ ($1 \leq i \leq k_{MAX}$) is a distribution of numbers of photoelectrons occurring in the photoelectric surface of photodetector upon incidence of the measurement-object light, thereby obtaining the intensity of the measurement-object light.

In other words, preparing for occurrence of k-photoelectron events in each of which a plurality of photoelectrons occur in the photoelectric surface, the pulse height distributions of k-photoelectron events statistically reliable are preliminarily estimated based on the pulse height distribution of single photoelectron events obtained by measurement. Therefore, even if the number of photoelectrons occurring in each event is unknown and even if the probability of occurrence of plural photoelectrons in each event is high, the distribution of numbers of photoelectrons occurring in the photoelectric surface of photodetector upon incidence of the measurement-object light can be estimated with accuracy and in turn, the intensity of the measurement-object light can be obtained with accuracy, by estimating the distribution of numbers of photoelectrons occurring in the photoelectric surface of photodetector upon incidence of the measurement-object light from the pulse height distribution N(h) with reference to the pulse height distributions $p_i(h)$ ($1 \leq i \leq k_{MAX}$).

In the light measuring apparatus of the present invention, a photodetector suitably applicable is a photodetector comprising (i) a photoelectric conversion surface for emitting photoelectrons in a number according to a photoelectron number distribution depending upon a light quantity of a beam incident thereto; (ii) an avalanche photodiode, between an anode and a cathode of which a reverse bias voltage is applied and a portion of which opposed to the photoelectric conversion surface is set at a higher potential than a potential of the photoelectric conversion surface, for avalanche-multiplying electron-hole pairs generated with incidence of the photoelectrons and outputting the current signal according to a number of electron-hole pairs thus avalanche-multiplied; and (iii) a vacuum vessel comprising an entrance window for transmitting the beam and enclosing the photoelectric conversion surface and the avalanche photodiode.

The photodetector as described above has a high resolution of pulse height value against photoelectron number, and it can clearly discriminate peaks respectively corresponding to k-photoelectron events in each of which the number of photoelectrons emitted with incidence of light is k, in the pulse height distribution of the current signal output from the photodetector, whereby the photoelectron number distribution according to the intensity of incident light, and the intensity of the incident light can be measured with accuracy.

In the light measuring apparatus of the present invention, the first generating means may be arranged to comprise (i) an analog-digital converter for receiving the voltage signal, converting the voltage signal to a digital value, and outputting the digital signal as a pulse height value; and (ii) event counting means for counting and storing a number of events occurring, for each digital value output from the analog-digital converter, whereby the pulse heights h can be handled as discrete digital values without a need for handling them as a continuous analog value.

In this case, the third generating means calculates values defined below to obtain a pulse height distribution of single photoelectron events $(p_1(h))$, $$p_k(h) = \sum_{j=0}^{h} (p_{k-1}(j) - p_1(h-j))$$

By using the digital values as starting values for the calculation arithmetic in this way, a digital computer having calculation programs can be employed as a means for executing calculation.

In the light measuring apparatus of the present invention, the photoelectron number distribution estimating means can estimate the photoelectron number distribution by the maximum likelihood method. The photoelectron number distribution can also be estimated as assuming that the photoelectron number distribution is a Poisson distribution. In either case, the photoelectron number distribution according to the light-quantity of a beam incident thereto and the light quantity of the beam can be measured with accuracy.

If the pulse height values h and pulse height distributions $p_i(h)$, N(h) are digital values, a digital computer can be suitably applicable for estimation of the photoelectron number distribution.

Generation of single photoelectron events can be realized by adopting the calibration sample for emitting very weak light instead of the measurement object.

It is also possible to realize such a condition that most of events occurring in the photodetector are single photoelectron events, by using the measurement object as it is and reducing the light before incidence to the photodetector. Complying with this method, the light measuring apparatus of the present invention may further comprise the light reducing means such as a light reducing filter for reducing the quantity of light incident to the photodetector when set in the collection mode of single photoelectron events.

The light measuring apparatus of the present invention can be applied to measurement of fluorescence occurring in the measurement object upon irradiation of the measurement object with excitation light. For such fluorescence measurement, the apparatus preferably further comprises (i) a pulsed light source for outputting pulsed light for irradiating a measurement object and also outputting a generation timing signal of the pulsed light; and (ii) operation timing signal generating means for generating an integration instruction signal and a collection instruction signal from the generation timing signal of the pulsed light and for sending the integration instruction signal to the integrating means and the collection instruction signal to the first generating means.

Generation of single photoelectron events upon fluorescence measurement can be realized by radiating excitation light to the calibration sample containing a very fine and known amount of fluorescent substance in place of the measurement object.

It is also possible to realize such a condition that most of events occurring in the photodetector are single photoelectron events, by using the measurement object as it is and reducing the fluorescence before incidence to the photodetector. Complying with this method, the light measuring apparatus of the present invention may further comprise the light reducing means such as a light reducing filter for reducing the quantity of light incident to the photodetector, when set in the collection mode of single photoelectron events.

It is also possible to realize such a condition that most of events occurring in the photodetector are single photoelectron events, by using the measurement object as it is and reducing the excitation light before irradiation of the measurement object. Complying with this method, the light measuring apparatus of the present invention may further comprise the light reducing means such as a light reducing filter for reducing the intensity of the excitation light before the excitation light irradiates the measurement object, when set in the collection mode of single photoelectron events.

The light measuring apparatus of the present invention may be arranged in such a manner that the apparatus further comprises: (i) the predetermined number of comparing means for comparing the voltage signal of each event with a predetermined number of reference voltages different from each other and outputting a logical pulse signal when the voltage signal is larger than each of the predetermined reference voltages; and (ii) comparison result counting means for counting logical pulse signals output from each of the predetermined number of comparing means, and that the estimating means estimates the photoelectron number distribution for the case wherein the measurement-object light is incident to the photodetector, based on the counting results of the comparison result counting means with incidence of the measurement-object light to the photodetector, the pulse height distribution of single photoelectron events already obtained ($p_1(h)$), and the pulse height distributions of k-photoelectron events already obtained ($p_k(h)$).

In this case, a comparator and a counter capable of operating at high speed are used for measurement of intensity of the measurement-object light, and thus, the measurement of light intensity can be carried out quickly. For example, if this light measuring apparatus is used in a laser scanning fluorescence microscope for obtaining a two-dimensional distribution of fluorescent substance in a sample, a repeating rate of excitation of sample can be enhanced, so that the time necessary for scanning the entire scanning range can be decreased.

Accordingly, the light measuring apparatus of the present invention can be suitably used as a light measuring apparatus for quantitatively measuring the number of fluorescent molecules in a sample by counting photons of fluorescence occurring from the sample excited by a pulsed laser source, for example, in the field of biochemistry or the like.

The light measuring apparatus of the present invention preferably further comprises measurement control means for giving an instruction of activation of the second generating means in the case of setting in the collection mode of single photoelectron events and giving an instruction of activation of the estimating means in the case of setting in the normal measurement mode.

In this case, an operator of the light measuring apparatus is necessitated only to notify the measurement control means of whether collection of single photoelectron events or collection of events with the normal measurement-object light without performing collection of single photoelectron events or collection of events with the normal measurement-object light as individually manipulating the second generating means and the third generating means, which can facilitate the measurement.

For example, for measuring light spontaneously emitted from the measurement object or fluorescence occurring upon irradiation with continuous excitation light, the measurement control means can be arranged to send the integration instruction signal to the integrating means and the collection instruction signal to the first generating means.

With provision of the measurement control unit, the apparatus may be arranged in such a manner that in the case of generation of single photoelectron events by the light reducing filter, the measurement control unit, receiving a notification of whether collection of single photoelectron events or collection of events with the normal measurement-object light to the measurement control unit, issues a single photoelectron event instruction signal and that the apparatus further comprises carrying means for locating the light reducing filter in the optical path of the measurement-object light or the excitation light, when the single photoelectron event instruction signal is significant, but removing the light reducing filter from the optical path of the measurement-object light or the excitation light, when the single photoelectron event instruction signal is non-significant.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
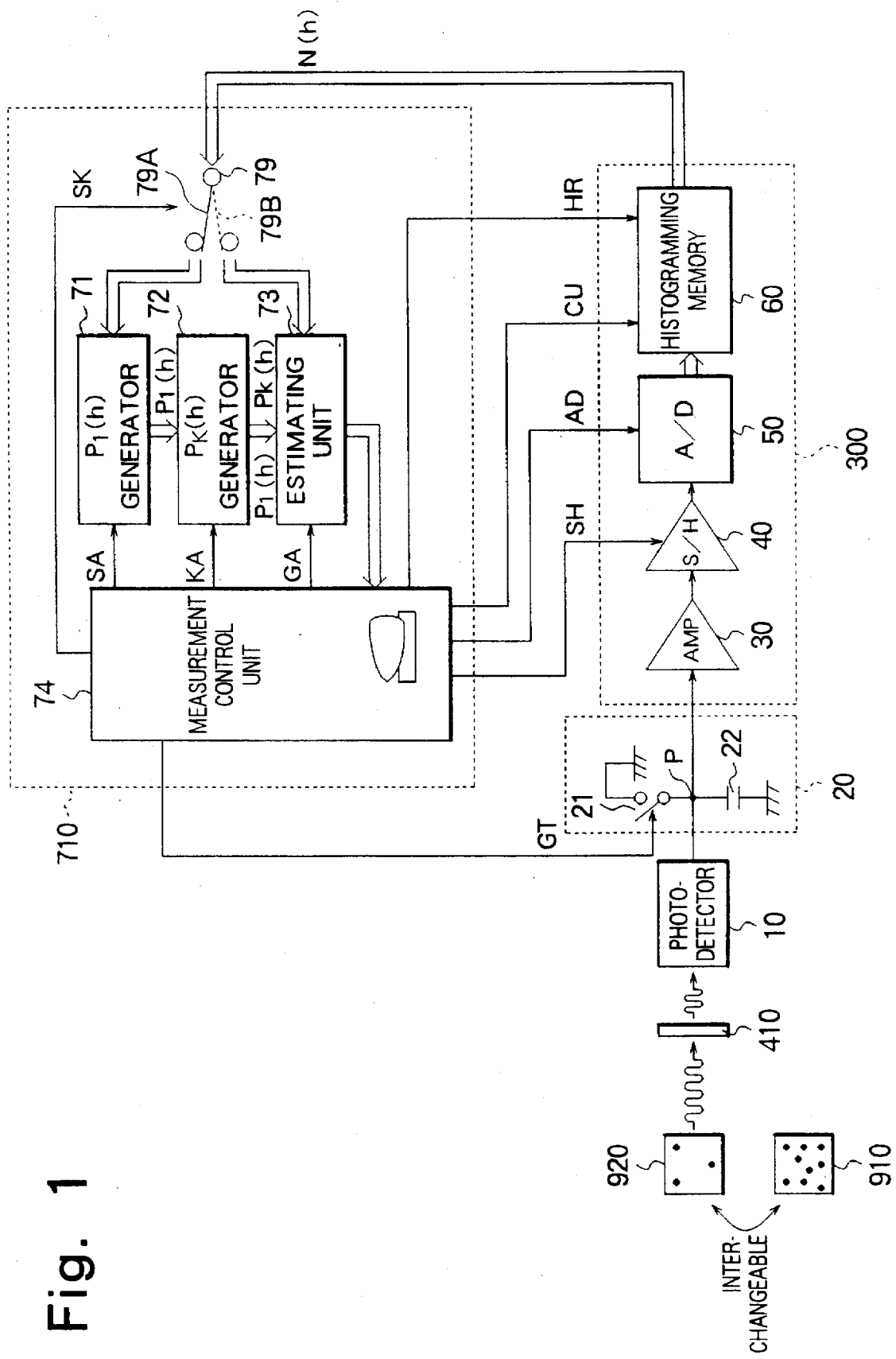
FIG. 1 is a structural drawing of a light measuring apparatus according to Embodiment 1 of the present invention.

The embodiments of the present invention will be described in detail with reference to the accompanying drawings. In the description of the drawings same elements will be denoted by same reference numerals and redundant description will be omitted.

(Embodiment 1)

FIG. 1 is a structural drawing of the light measuring apparatus according to Embodiment 1 of the present invention.

As shown in FIG. 1, the apparatus of the present embodiment comprises (a) a photodetector 10 for receiving spontaneous emission light from a measured object 910 or from a calibration sample 920 through a wavelength filter 410, emitting photoelectrons in the number according to a distribution of photoelectron numbers depending upon the number of photons of incident light, multiplying the photoelectrons, and outputting them as a current signal, (b) an integrator 20 for integrating the current signal output from the photodetector 10 to convert it to a voltage signal and outputting it as a pulse height value of one event, (c) a generating section 300 for collecting a pulse height value of each event and generating a pulse height distribution of event number against pulse height value (N(h); h is pulse height values), and (d) a processing section 710 for collecting the pulse height distribution (N(h)) generated by the generating section 300 to process it and for outputting operation timing signals to the integrator 20 and to the generating section 300.

Figure 2:
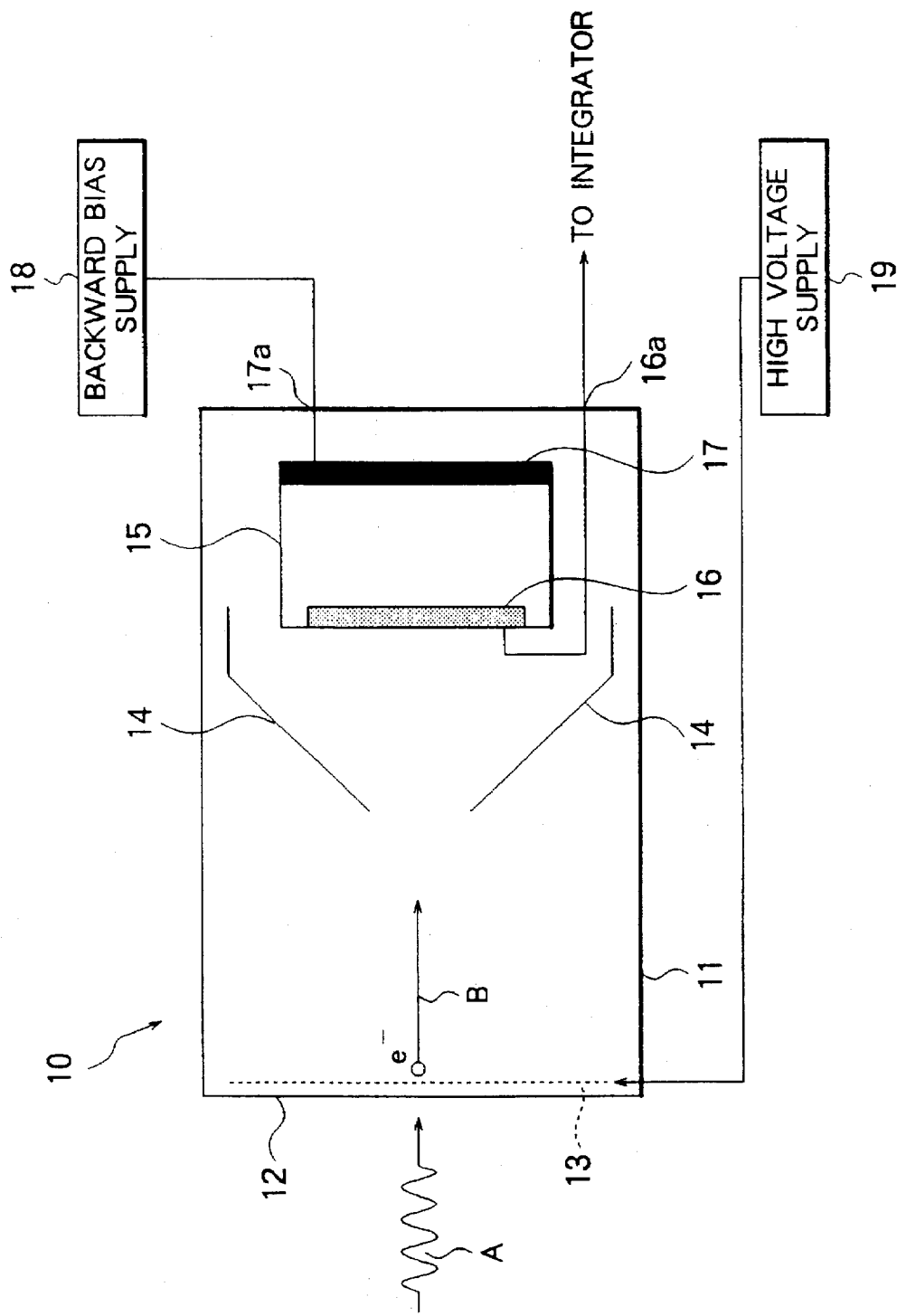
FIG. 2 is a structural drawing of photodetector 10 utilizing an avalanche photodiode (APD)

The photodetector 10, receiving the incident light, emits photoelectrons in the number according to the distribution of photoelectron numbers depending upon the intensity of the incident light and multiplies the photoelectrons to output a current signal. For example, a suitably applicable photodetector is one utilizing an avalanche photodiode (hereinafter referred to as APD) (reference: Shawn J. Fagen, "Vacuum avalanche photodiodes can count single photons," Laser Focus World, Nov. (1993) pp. 125–132. FIG. 2 shows the structure of this photodetector utilizing the APD.

This photodetector 10 is arranged in such a manner that an entrance window 12 is formed in a part of a vacuum vessel 11 the inside of which is kept in a vacuum and that the incident light A passes through the entrance window 12 to reach a photoelectric surface 13. Since a high-voltage supply 19 applies a high voltage, −10 kV to −15 kV for example, to the photoelectric conversion surface 13, with incidence of the incident light A to the photoelectric conversion surface 13, the photoelectric conversion surface 13 emits photoelectrons B in the number according to the distribution of photoelectron numbers depending upon the intensity of the incident light A. Then the photoelectrons B are accelerated by an electric field between the photoelectric surface 13 and the APD 15 to be focused by a focusing electrode 14 set at a predetermined potential and having an aperture in the central portion thereof and then to enter the APD 15.

Figure 3:
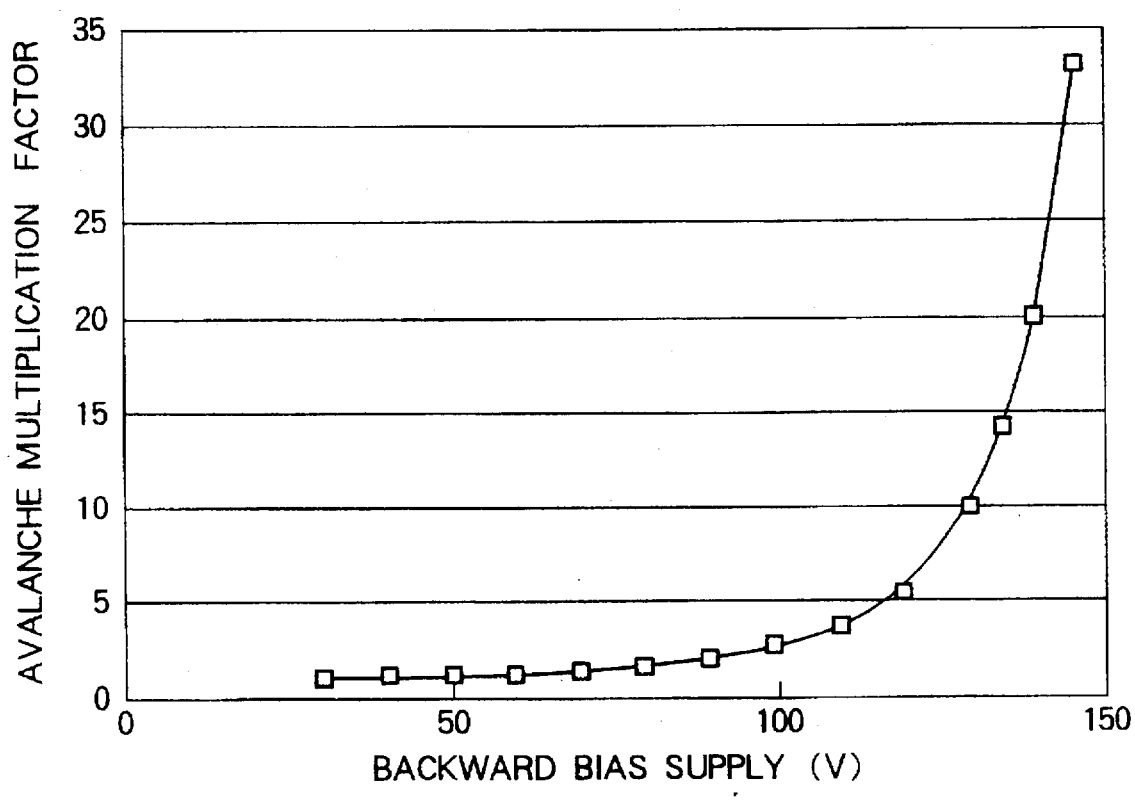
FIG. 3 is a graph to show the relationship between reverse bias voltage and avalanche multiplication factor in the APD.

This APD 15 is arranged so that a reverse bias voltage (+145 V, for example) is applied between the anode 16 and the cathode 17 thereof by a reverse bias supply 18 and so that the potential of the anode 16 facing the photoelectric conversion surface 13 is higher than that of the photoelectric conversion surface 13. When the photoelectrons B collide with this APD 15, a pair of electron and hole is generated per energy 3.6 eV, which the photoelectrons have lost for ionization in the APD 15. Then the electron-hole pairs are avalanche-multiplied according to the avalanche multiplication factors having the relation shown in FIG. 3 against the reverse bias voltage in the APD 15 to be output as an electric current signal between the anode terminal 16a and the cathode terminal 17a. However, the energy lost in the APD 15 by the photoelectrons is not constant, but is according to a certain distribution. Further, the multiplication factors of APD 15 are not constant, either, but are according to a certain multiplication factor distribution. Therefore, magnitudes of current signals output upon incidence of single photoelectron are also distributed in a certain distribution.

Accordingly, when the photodetector 10 detects light of constant intensity many times, a distribution of numbers of photoelectrons emitted from the photoelectric conversion surface 13 (a photoelectron number distribution) becomes a distribution spread around a certain mean value according to the intensity, so that current signals output from the photodetector 10 have a distribution further spread in accordance with a distribution of numbers of electron-hole pairs output from the APD 15 with incidence of single photoelectron.

This photodetector 10 utilizing the APD can also count single photons as the photomultiplier tube can. Further, the photodetector 10 has smaller multiplication noise than the photomultiplier tube, and therefore, has such an excellent feature that it can identify peaks respectively corresponding to k-photoelectron events, i.e., events in which numbers of photoelectrons emitted with incidence of light to the photoelectric conversion surface 13 are k (k=1, 2, 3, ... ) in the pulse height distribution of current signals obtained by multiple measurements of the light of constant quantity. The photodetector 10 utilizing the APD, having such features, is thus suitably applicable to the light measuring apparatus according to the present invention.

The integrator 20, receiving a current signal output from the photodetector 10, time-integrates the current signal over a certain period of time to convert it to a voltage signal. This integrator 20 is constructed of a switch 21 and a capacitor 22 disposed in parallel between the anode terminal 16a and the ground terminal of the photodetector 10. The switch 21 is opened and closed in synchronization with the timing of incidence of the incident light A to the photodetector 10. For example, the switch 21 is opened only for a constant time of from time t1 to time t2 with a reference at the incidence time of the pulsed incident light A. The capacitor 22 integrates the current signal output from the photodetector 10 only during the opening period of the switch 21, and a potential as the integration result thereof appears at one terminal (at point P in the drawing). When the switch 21 is closed, the charge accumulated in the capacitor 22 is discharged, so that the potential at point P becomes the ground potential.

The generating section 300 comprises (i) an amplifier 30 for receiving the voltage signal output from the integrator 20 and amplifying it to output, (ii) a sample holder 40 for sampling or holding the voltage signal output from the amplifier 30 in accordance with a sample instruction signal, (iii) an analog-digital converter (AD converter) 50 for receiving the voltage signal as an analog signal output from the sample holder 40 and converting it to a digital signal having a digital value (i.e., a pulse height value) according to a voltage value in response to an AD conversion instruction signal AD, and (iv) a histogramming memory 60 for receiving the digital signal output from the AD converter 50 and cumulatively adding a predetermined value (1, for example) to an address according to the pulse height value in response to a count instruction signal CU. The contents of the histogramming memory 60 all are reset to 0 in accordance with an instruction of memory reset signal HR.

The processing section 710 comprises (i) a generator 71 activated in accordance to an activation instruction signal SA to calculate Eq. 3 defined below based on the pulse height distribution ($N_1(h)$) generated by the generating section 300, thereby obtaining a pulse height distribution of single photoelectron events ($p_1(h)$), $$p_1(h) = N_1(h) / \sum_{h=0}^{h_{max}} N_1(h)$$

(ii) a generator 72 for recursively calculating Eq. 4 defined below based on the pulse height distribution of single photoelectron events ($p_1(h)$) to obtain pulse height distributions of k-photoelectron events ($p_k(h)$), in each of which the number of photoelectrons emitted in the photodetector 10 is k ($2 \leq k \leq k_{max}$), $$p_k(h) = \sum_{j=0}^{h} (p_{k-1}(j) \cdot p_1(h-j))$$

(iii) an estimating unit 73 for estimating a photoelectron number distribution for the case where the measurement-object light is incident to the photodetector 10, based on a pulse height distribution (N(h)) generated by the generating section 300 upon setting in a normal measurement mode and when the measurement-object light is incident to the photodetector, the pulse height distribution of single photoelectron events ($p_1(h)$) already obtained, and the pulse height distributions of k-photoelectron events ($p_k(h)$) already obtained, and thereby obtaining the intensity of the measurement-object light; (iv) a switch device 79 for receiving the pulse height distribution N(h) output from the generating section 300 and for outputting it in an alternative way to the generator 71 or to the estimating unit 73 in accordance with a data direction instruction signal SK; and (v) a measurement control unit 74 for giving an instruction of activation of the generator 71 in a collection mode of single photoelectron events and giving an instruction of activation of the estimating unit 73 in the normal measurement mode, and for outputting operation timing signals (GT, SH, AD, CU, HR) to the integrator 20 and to the generating section 300.

For example, a digital computer system may be suitably adopted as the processing section 710.

The apparatus of the present embodiment measures the intensity of the measurement-object light in the following manner.

Prior to measurement of the measurement-object light, the pulse height distributions $p_i(h)$ ($1 \leq i \leq k_{MAX}$) for calibration are generated. For generation of the pulse height distributions $p_i(h)$, the calibration sample 920 is used.

The measurement control unit 74 first turns the memory reset signal temporarily significant, so as to reset the all contents of the histogramming memory 60 to the count value "0."

Figure 4:
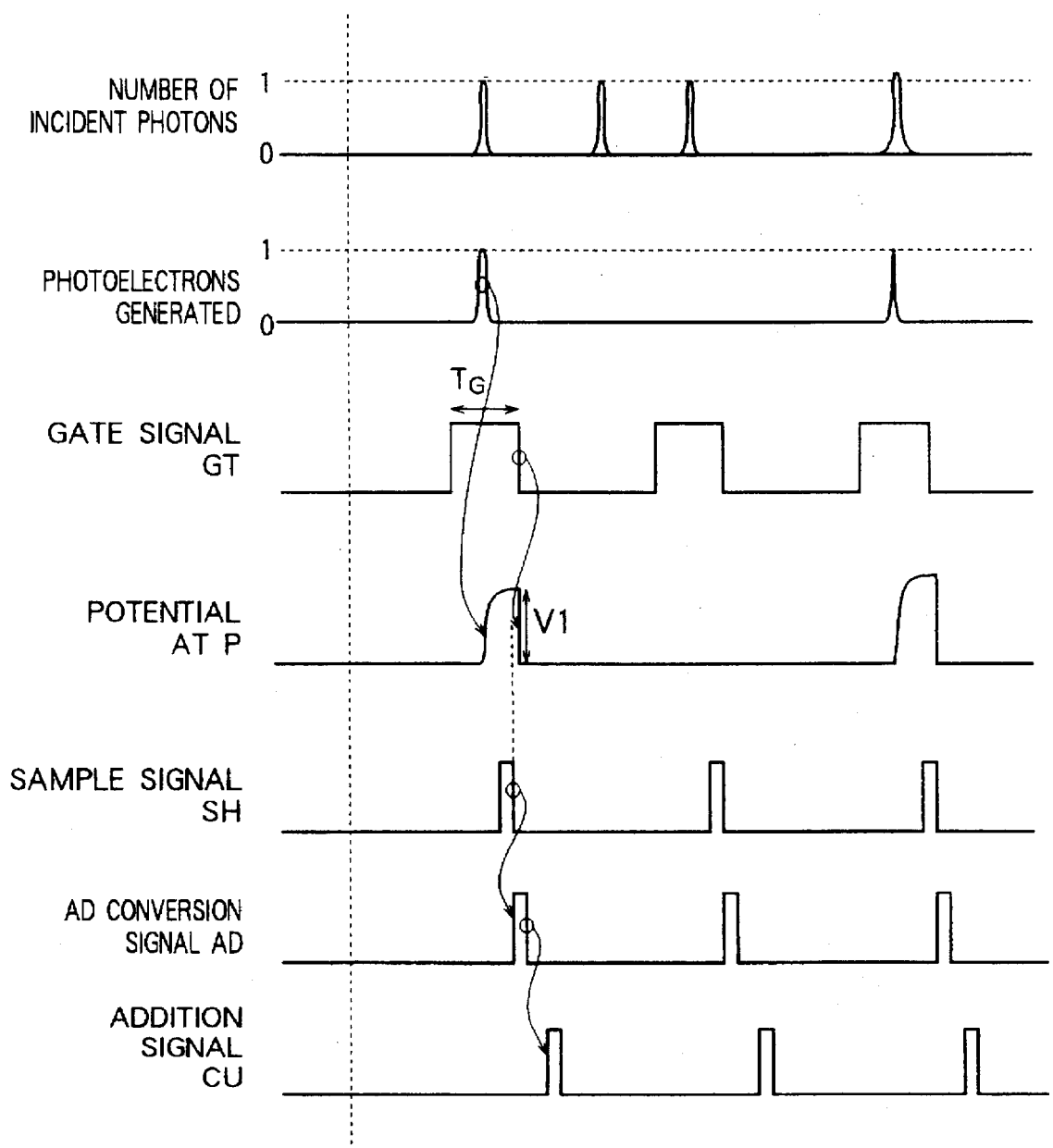
FIG. 4 is a timing chart to illustrate the operation upon collection of single photoelectron events in the light measuring apparatus of Embodiment 1.

The light emitted from the calibration sample 920 is incident through the wavelength filter 410 to the photodetector 10. FIG. 4 is a timing chart to illustrate the operation of from incidence of light to the photodetector 10 up to generation of the pulse height distribution $N_1(h)$ output from the generating section 300.

For collecting one event, the measurement control unit 74 makes the gate signal GT, which is an integration instruction signal, significant throughout time $T_G$. During the significant period of the gate signal GT, the switch 21 is kept in an open state, whereby a current signal output from the photodetector 10 is integrated and charges depending upon the current signal are accumulated in the capacitor 22. Then a potential is built up at point P in accordance with the charges accumulated, and a voltage signal is output.

The calibration sample 920 is adjusted so that it emits only light of very small quantity and, in most cases, only at most one photon is incident to the photodetector 10 while the gate signal GT is significant. Accordingly, the number of photoelectrons generated in the photoelectric surface 13 during the significant period of gate signal GT is at most 1 in most cases.

The voltage signal output from the integrator 20 is supplied to the generating section 300. In the generating section 300, the amplifier 30 receives the voltage signal output from the integrator 20 to amplify it and supplies the amplified signal to the sample holder 40.

The measurement control unit 74 makes the sample instruction signal SH significant during the significant period of gate signal GT and changes the sample instruction signal SH from significant to non-significant immediately before the gate signal GT transitions from significant to non-significant.

The sample holder 40 performs sampling in the significant state of the sample instruction signal SH and keeps holding in the non-significant state of the sample instruction signal SH the voltage value sampled at the time when the sample instruction signal SH is changed from significant to non-significant. Namely, the sample holder 40 keeps outputting the voltage value according to the potential value at point P immediately before transition of gate signal GT from significant to non-significant, after the sample instruction signal SH is changed from significant to non-significant.

The voltage signal output from the sample holder 40 is supplied to the AD converter 50. After the sample instruction signal SH is changed from significant to non-significant, the measurement control unit 74 makes the AD conversion signal AD temporarily significant to notify the AD converter 50 of an execution instruction of the AD conversion operation. The AD converter 50, instructed to execute the AD conversion operation, converts the input voltage value, which is an analog value, to a digital value and outputs the digital signal carrying a pulse height value in one event.

The digital signal output from the AD converter 50 is supplied to the histogramming memory 60. At a proper time after completion of the AD conversion operation of the AD converter 50, the measurement control unit 74 makes the addition signal CU temporarily significant to notify the histogramming memory 60 of an addition instruction. The histogramming memory 60, receiving the addition instruction, adds only 1 to the contents at an address according to the pulse height value input.

After completion of the above operation of from change of gate signal GT to significant, to updating of the contents of the histogramming memory 60, the operation of from again changing the gate signal GT to significant, to updating the contents of the histogramming memory 60 is repeated a predetermined number of times, thereby generating the pulse height distribution $N_1(h)$ ($0 \leq h \leq h_{MAX}$) inside the histogramming memory 60.

After the pulse height distribution $N_1(h)$ is generated as described above, the pulse height distribution $p_1(h)$ ($1 \leq h \leq h_{MAX}$) of single photoelectron events is generated.

For generating the pulse height distribution $p_1(h)$, the measurement control unit 74 controls the switch device 79 by the data direction instruction signal SK to keep it in the state of 79A, thereby setting the destination of data of the pulse height distribution $N_1(h)$ output from the generating section 300, to the generator 71. After that, the measurement control unit 74 turns the activation instruction signal SA significant to activate the generator 71.

Figure 5:
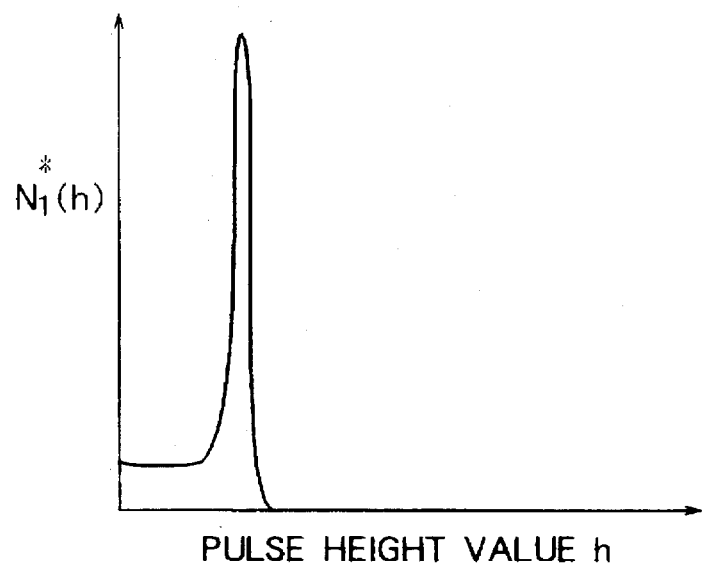
FIG. 5 is a graph to show the pulse height distribution $N^*_1(h)$.
Figure 6:
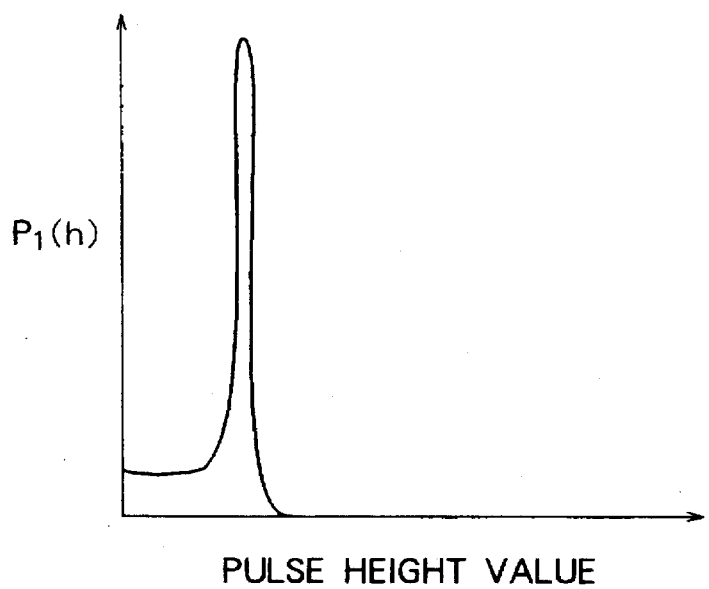
FIG. 6 is a graph to show the pulse height distribution $p_1(h)$.

The generator 71, thus activated, collects the raw data of pulse height distribution $N_1(h)$ from the generating section 300, and in order to eliminate noise components or zero photoelectron events in the low pulse height portion, the generator 71, by extrapolation from values of the other pulse height portion, obtains $N^*_1(h)$ shown in FIG. 5 as a pulse height distribution of the low pulse height portion. Then the generator 71 performs the following calculation to generate the pulse height distribution $p_1(h)$ of single photoelectron events shown in FIG. 6.

$$p_1(h) = N_1^*(h) / \sum_{h=0}^{h_{max}} N_1^*(h) \tag{5}$$

where $h_{MAX}$: the maximum of output digital value from the AD converter 50.

The number of photoelectrons generated in the photoelectric surface 13 in one event is at most 1 in the most cases, but occurrence of photon in the calibration sample 920 is a probability phenomenon, so that occurrence of plural photoelectrons cannot be suppressed perfectly. Thus, the minimum pulse height h out of the peaks in the pulse height distribution $N_1(h)$ generated by the generating section 300 is assumed to be a peak of the pulse height value of single photoelectron events, and the pulse height distribution $N^*_1$(h) concerning the single photoelectron events is estimated from this peak shape. Then the following calculation is carried out to obtain the pulse height distribution $p_1(h)$ of single photoelectron events shown in FIG. 6.

$$p_1(h) = N_1^*(h) / \sum_{h=0}^{h_{max}} N_1^*(h) \tag{5a}$$

After the pulse height distribution $p_1(h)$ of single photoelectron events is generated as described above, the pulse height distributions $p_k(h)$ ($2 \leq k \leq k_{MAX}$) of k-photoelectron events are generated.

For generating the pulse height distribution $p_1(h)$, the measurement control unit 74 changes the activation instruction signal KA to significant, thereby activating the generator 72.

The generator 72, thus activated, collects the data of pulse height distribution $p_1(h)$ from the generator 71 and recursively calculates the following to generate the pulse height distributions $p_k(h)$ of k-photoelectron events.

$$p_k(h) = p_{k-1}(j) \otimes p_1(j-j) \tag{6}$$
$$= \sum_{j=0}^{h} (p_{k-1}(j) \cdot p_1(h-j))$$

In the case of an arbitrary distribution being assumed upon estimation of photoelectron number distribution, letting $h_{peak\ 1}$ be a pulse height value giving the peak value of $p_1(h)$, $k_{MAX}$ is determined by $k_{MAX} = h_{max}/h_{peak\ 1}$. If $h_{max} = 4095$ and $h_{peak\ 1} = 400$, $k_{MAX}$ is approximately 10. If the photoelectron number distribution is assumed to be a Poisson distribution, $k_{MAX}$ is approximately 2 to 3 times $h_{max}/h_{peak\ 1}$. For example, if $h_{max}=4095$ and $h_{peak\ 1}=400$, $k_{MAX}$ is approximately 30 in this case. The ground that the pulse height distributions $p_k(h)$ can be obtained from the convolution calculation between the pulse height distributions $p_{k-1}(h)$ and $p_1(h)$ as described above is based on the fact that k photoelectrons emitted in the photoelectric surface 13 and entering the APD 15 avalanche-multiply electron-hole pairs independently of each other.

If the spread of pulse height distribution caused by the noise generated in the photodetector 10, integrator 20, and amplifier 30 cannot be ignored, the pulse height distributions $p_k(h)$ each are calculated by Eq. (6), based on the result of eliminating the influence of the noise from the pulse height distribution $p_1(h)$ by deconvolution calculation, and thereafter the influence of the noise is superimposed on each of the pulse height distributions $p_k(h)$ (k=2, 3, ..., $k_{MAX}$) by convolution calculation.

Figure 7:
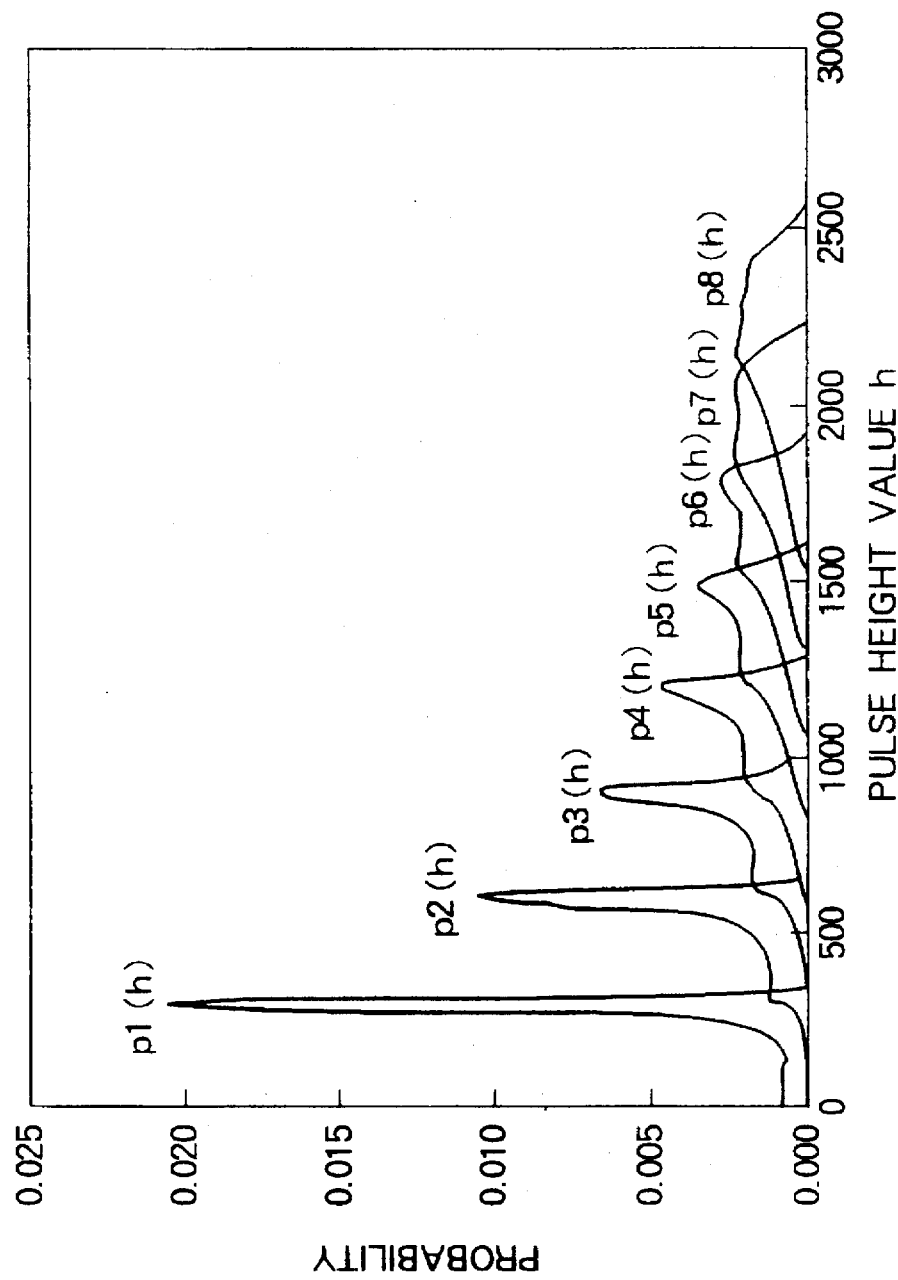
FIG. 7 is a graph to show the pulse height distributions $p_k(h)$ of k-photoelectron events.

As described above, the pulse height distributions $p_k(h)$ (k=1, 2, 3, ..., $k_{MAX}$), with consideration on the influence of the noise which the light measuring apparatus inherently has, are prepared prior to light-quantity measurement of the measurement-object light. FIG. 7 is a drawing to show the pulse height distributions $p_k(h)$ of k-photoelectron events obtained in this way. In this figure, $k_{MAX}=8$.

After the pulse height distributions $p_i(h)$ (i=1, ..., $k_{MAX}$) are generated as described above, the calibration sample 920 is replaced by the measurement object 910 and the measurement-object light from the measurement object 910 is measured.

The measurement control unit 74 first turns the memory reset signal temporarily significant to reset the all contents of histogramming memory 60 to the count value "0."

Figure 8:
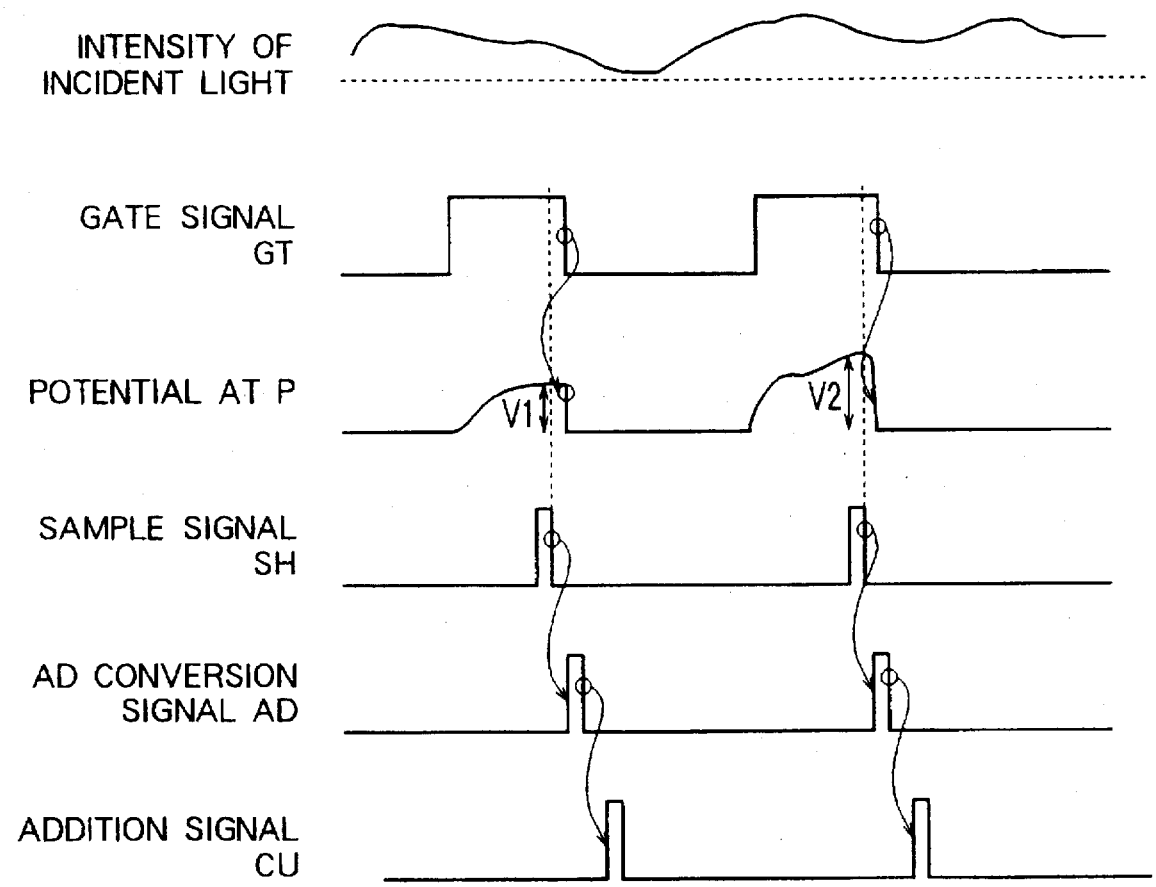
FIG. 8 is a timing chart to illustrate the operation upon measurement of measurement-object light in the light measuring apparatus of Embodiment 1.

The light emitted from the measurement object 910 is incident through the wavelength filter 410 to the photodetector 10. FIG. 8 is a timing chart to illustrate the operation of from incidence of light to the photodetector 10 to generation of pulse height distribution N(h) output from the generating section 300.

Similarly as in the case of measurement of single photoelectron events, the measurement control unit 74 sends the gate signal GT to the integrator 20 and also sends the operation timing signals (SH, AD, CU, HR) to the generating section 300. Accordingly, the integrator 20 and generating section 300 operate in the same manner as in the case of single photoelectron events, thereby generating the pulse height distribution N(h) according to incidence of the measurement-object light inside the histogramming memory 60.

After the pulse height distribution N(h) is generated as described above, estimated is a photoelectron number distribution generated in the photoelectric surface 13 in each event with incidence of the measurement-object light, thereby obtaining the intensity of the incident light.

For estimating the photoelectron number distribution, the measurement control unit 74 controls the switch device 79 by the data direction instruction signal SK to turn it to the state of 79B, whereby the destination of data of pulse height distribution $N_1(h)$ from the generating section 300 is set to the estimating unit 73. After that, the measurement control unit 74 makes the activation instruction signal GA significant to activate the estimating unit 73.

The estimating unit 73, thus activated, collects the data of pulse height distribution N(h) from the generating section 300 and receives the pulse height distributions $p_i(h)$ from the generator 72, and the estimating unit 73 performs the following arithmetic using the pulse height distribution N(h) and the pulse height distributions $p_i(h)$.

The pulse height distribution N(h) does not have to be normalized and thus, it may be the same values as accumulated in the histogramming memory 60. Namely, the pulse height distribution N(h) indicates a distribution of events having obtained the pulse height value h. For example, the maximum likelihood method is used for estimating the distribution of numbers of photoelectrons emitted in the photoelectric conversion surface 13 of photodetector 10 with incidence of the incident light (or for estimating the photoelectron number distribution). Namely, letting $q_k$ (k=1, 2, 3, ..., K) be a probability of occurrence of each of k-photoelectron events, $q_k$ is obtained which make maximum logarithmic likelihood expressed by Eq. (7) defined below, and it is used as an estimated photoelectron number distribution.

$$\log L = \left( N - \sum_{h=0}^{h_{max}} N(h) \right) \cdot \log(p_{ND}) + \sum_{h=0}^{h_{max}} (N(h) \cdot \log \{p(h)\}) \quad (7)$$

Here, N is the number of measurements (i.e., the number of significant turns of gate signal GT), and $h_{min}$ is a minimum pulse height value h that can be used for analysis. If the pulse height value h is small, it cannot be used for analysis because of superposition of the noise caused by the photodetector 10, amplifier 30, etc. Thus, analysis is carried out only with values exceeding the pulse height value $h_{min}$. Further, p(h) and $p_{ND}$ are given as follows.

$$p(h) = \sum_{k=1}^{k_{max}} q_k \cdot p_k(h) \quad (8)$$

$$p_{ND} = 1 - \sum_{h=0}^{h_{max}} p(h) \quad (9)$$

This p(h) indicates an occurrence probability distribution of pulse height value h also taking account of occurrence probabilities (photoelectron number distribution) of respective k-photoelectron events (k=1, 2, 3, ..., K). For obtaining $q_k$ to maximize the logarithmic likelihood of Eq. (7), a numerical computation method, for example the quasi Newton method, used for optimization problem is applied.

If the photoelectron number distribution is assumed to be a Poisson distribution, probabilities $q_k$ (k=1, 2, 3, ..., $k_{MAX}$) of occurrence of respective k-photoelectron events are expressed as follows.

$$q_k = \frac{\lambda^k}{k!} \exp(-\lambda) \quad (10)$$

Figure 9:
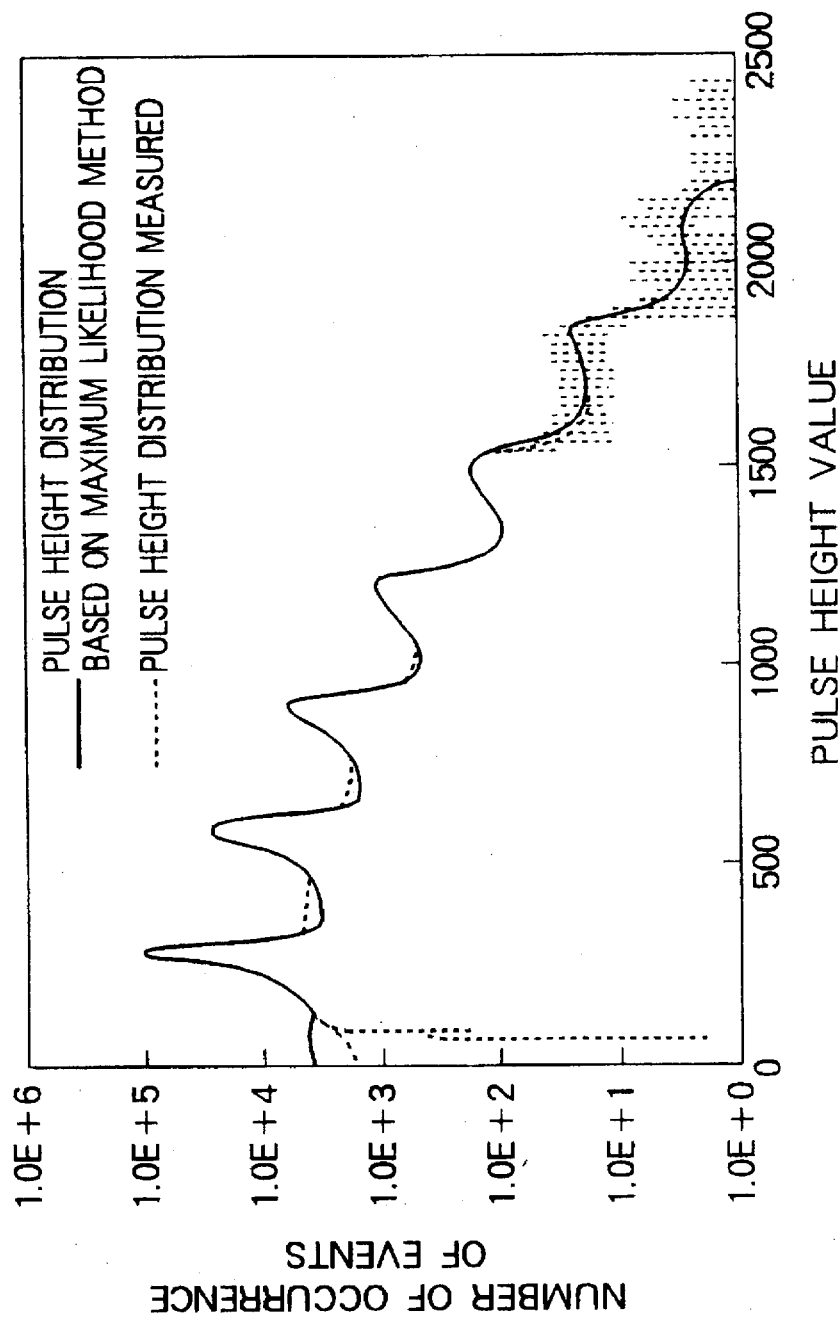
FIG. 9 is a drawing to show a pulse height distribution obtained by measuring the measurement-object light (dashed line) and a pulse height distribution calculated based on the $\lambda$ value estimated by maximum likelihood method (solid line)

Here, $\lambda$ is a mean value of numbers of photoelectrons emitted from the photoelectric conversion surface 13. In this case, obtaining the photoelectron number: distribution to maximize the logarithmic likelihood is equivalent to obtaining the $\lambda$ value to maximize the logarithmic likelihood, which can be obtained by numerical computation, for example, such as the golden section method or the like. In the following description the photoelectron number distribution is assumed to be a Poisson distribution. FIG. 9 shows an example of the pulse height distribution (dashed line) generated in the histogramming memory 60 with reception of the measurement-object light by the photodetector 10 and the pulse height distribution (solid line) calculated based on the $\lambda$ value estimated by the maximum likelihood method. They show good agreement in the range of not less than the pulse height value $h_{min}$ (=150). The mean value $\lambda$ of photoelectron numbers estimated at this time was 1.03.

Figure 10:
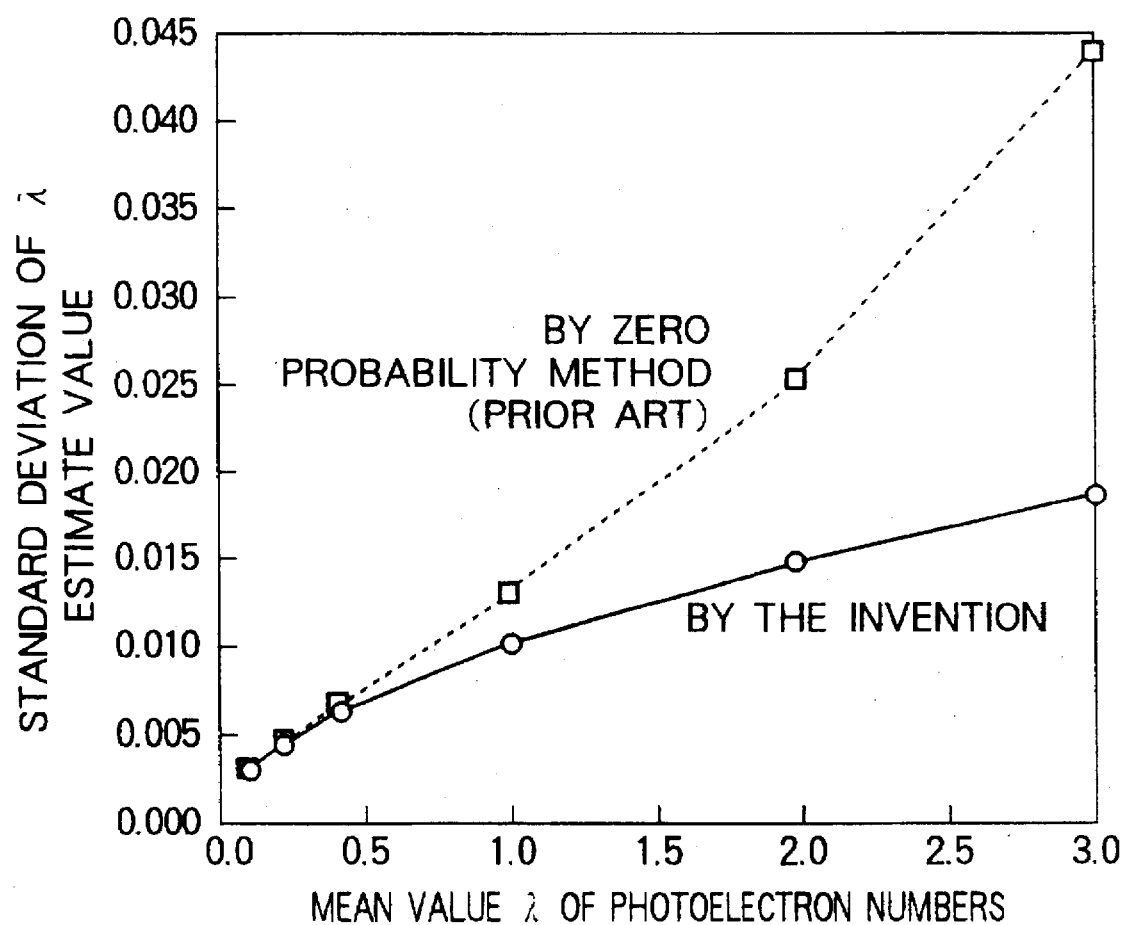
FIG. 10 is a drawing to show the results of theoretical comparison between the light measuring apparatus of Embodiment 1 and the conventional technology (the estimation method utilizing the zero probability) as to estimation errors of the mean value $\lambda$ of photoelectron numbers.

Next described is the theoretical comparison between the light measuring apparatus according to Embodiment 1 and the conventional technology (the estimation method utilizing the zero probability) as to the estimation errors of the mean value $\lambda$ of photoelectron numbers. FIG. 10 is a drawing to show the results of comparison between the estimation method by the present embodiment and the estimation method utilizing the zero probability.

Assuming the mean value $\lambda_0$ of numbers of photoelectrons emitted from the photoelectric conversion surface of photodetector was 0.1, 0.2, 0.4, 1.0, 2.0, or 3.0, 500 pulse height distributions were made for each mean value by simulation calculation and then mean values $\lambda$ of photoelectron numbers were estimated by the respective techniques using them. Then standard deviations of distributions of the estimate values were obtained. Marks ◊ in FIG. 10 represent theoretical values of the standard deviation of the distribution of estimate $\lambda$ values when the light measuring apparatus according to the first embodiment is used, and marks □ represent theoretical values of the standard deviation of the distribution of estimate $\lambda$ values when the estimation method utilizing the zero probability is used.

It is understood from this figure that the mean value $\lambda$ of photoelectron numbers can be estimated with higher accuracy in use of the light measuring apparatus according to the first embodiment than in estimation by the estimation method utilizing the zero probability. Particularly, if the mean value $\lambda$ of photoelectron numbers is over 0.4, the difference increases between the standard deviations of the distributions of estimate $\lambda$ values by the respective estimation methods as the mean value $\lambda$ becomes greater. This means that the mean value $\lambda$ can be estimated at high accuracy using the light measuring apparatus according to the first embodiment even if the mean value $\lambda$ of numbers of photoelectrons emitted from the photoelectric conversion surface 13 after the incident light is incident to the photodetector 10 is large. Namely, the light quantity of the incident light can be obtained at good accuracy.

Figure 11:
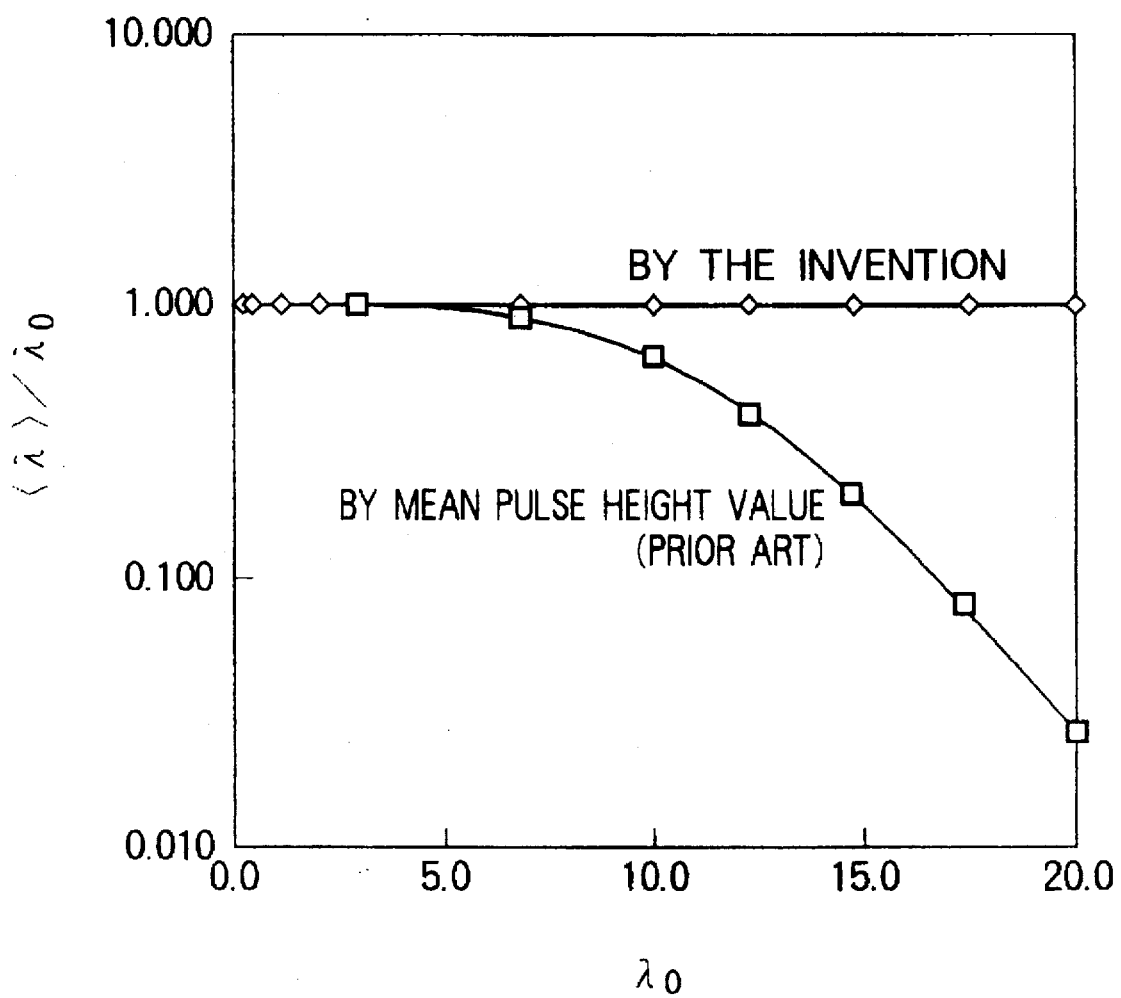
FIG. 11 is a drawing to show the results of theoretical comparison between the light measuring apparatus of Embodiment 1 and the conventional technology (the estimation method utilizing the mean pulse height value) as to estimation errors of the mean value $\lambda$ of photoelectron numbers.

Next described is the theoretical comparison between the light measuring apparatus according to Embodiment 1 and the conventional technology (the estimation method utilizing the mean pulse height value) as to the estimation errors of the mean value $\lambda$ of photoelectron numbers. FIG. 11 is a drawing to show the results of comparison between the estimation method by the present embodiment and the estimation method utilizing the mean pulse height value.

Assuming that the mean value $\lambda_0$ of numbers of photoelectrons emitted from the photoelectric conversion surface of photodetector was 0.1, 0.2, 0.4, 1.0, 2.0, 3.0, 7.0, 10.0, 12.5, 15.0, 17.5, or 20.0, 500 pulse height distributions were made for each mean value by simulation calculation and the mean value X of photoelectron numbers was estimated by each technique using them. Then the ratio $<\lambda>/\lambda_0$ was obtained between the mean value $<\lambda>$ of 500 estimate $\lambda$ values and $\lambda_0$ given upon generation of pulse height distribution in simulation. In FIG. 11 marks ◊ indicate $<\lambda>/\lambda_0$ in the case of use of the light measuring apparatus according to the first embodiment and marks □ represent $<\lambda>/\lambda_0$ in the case of use of the estimation method utilizing the mean pulse height value.

It is seen from this figure that with the conventional technology utilizing the mean pulse height value, if the mean photoelectron number $\lambda_0$ is greater than 7, the frequency of occurrence of events of pulse height values greater than $h_{max}$ becomes unignorable and estimate values are smaller than the true value. This means that when an amount of a fluorescent substance is determined based on this evaluation method, under evaluation will result. In the case of $\lambda_0=20$, only 5% of output pulses from the photomultiplier tube are detected with pulse height values between $h_{min}$ and $h_{max}$. On the other hand, in the case of the evaluation method by the light measuring apparatus according to Embodiment 1, an estimate value nearly equal to the true value can be obtained even if the value of $\lambda_0$ reaches 20.

(Embodiment 2)

Figure 12:
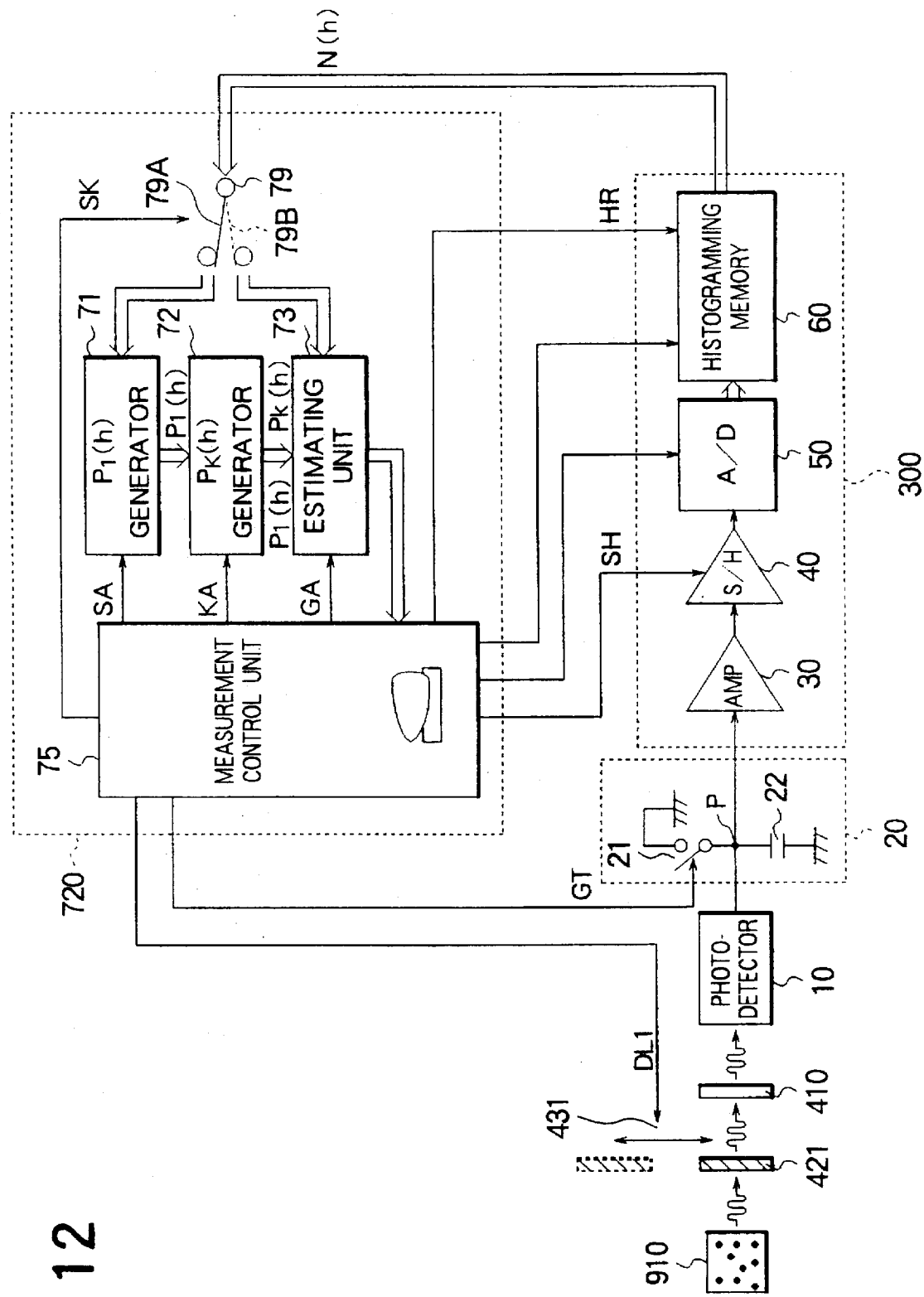
FIG. 12 is a structural drawing of a light measuring apparatus according to Embodiment 2 of the present invention.

FIG. 12 is a structural drawing of Embodiment 2 of the light measuring apparatus according to the present invention. The apparatus of the present embodiment is different from Embodiment 1 in that measurement of the measurement-object light is carried out without a need for the calibration sample. Because of this difference of function, the apparatus of the present embodiment is different from that of Embodiment 1 in FIG. 1 in that the apparatus of the present embodiment further comprises (i) a light reducing filter 421, and (ii) a carrier 431 for carrying the light reducing filter 421 in accordance with a light reducing instruction signal DL1 and the processing section 720 comprises a measurement control unit 75 for sending the light reducing instruction signal DL1 to the carrier 431, as shown in FIG. 12.

The apparatus of the present embodiment measures the intensity of the measurement-object light in the following manner.

Similarly as in Embodiment 1, prior to the measurement of the measurement-object light, the pulse height distributions for calibration $p_i(h)$ ($1 \leq i \leq k_{MAX}$) are generated. For generating the pulse height distributions $p_i(h)$, the measurement control unit 75 changes the light reducing instruction signal DL1 to significant to control the carrier 431 so as to locate the light reducing filter 421 on the optical path before the measurement-object light from the measurement object 910 is incident to the photodetector 10.

After that, the pulse height distributions $p_i(h)$ ($1 \leq i \leq k_{MAX}$) are generated by the same operation as in Embodiment 1.

After the pulse height distributions $p_i(h)$ ($1 \leq i \leq k_{MAX}$) are generated in this way, the measurement control unit 75 turns the light reducing instruction signal DL1 non-significant to control the carrier 431 so as to remove the light reducing filter 421 from the optical path before the measurement-object light from the measurement object 910 is incident to the photodetector 10, thereby letting the measurement-object light directly enter the photodetector 10.

After that, the same operation as in Embodiment 1 is carried out to estimate the photoelectron number distribution of photoelectrons generated in the photoelectric surface 13 with incidence of the measurement-object light thereto, thereby obtaining the intensity of the measurement-object light.

(Embodiment 3)

Figure 13:
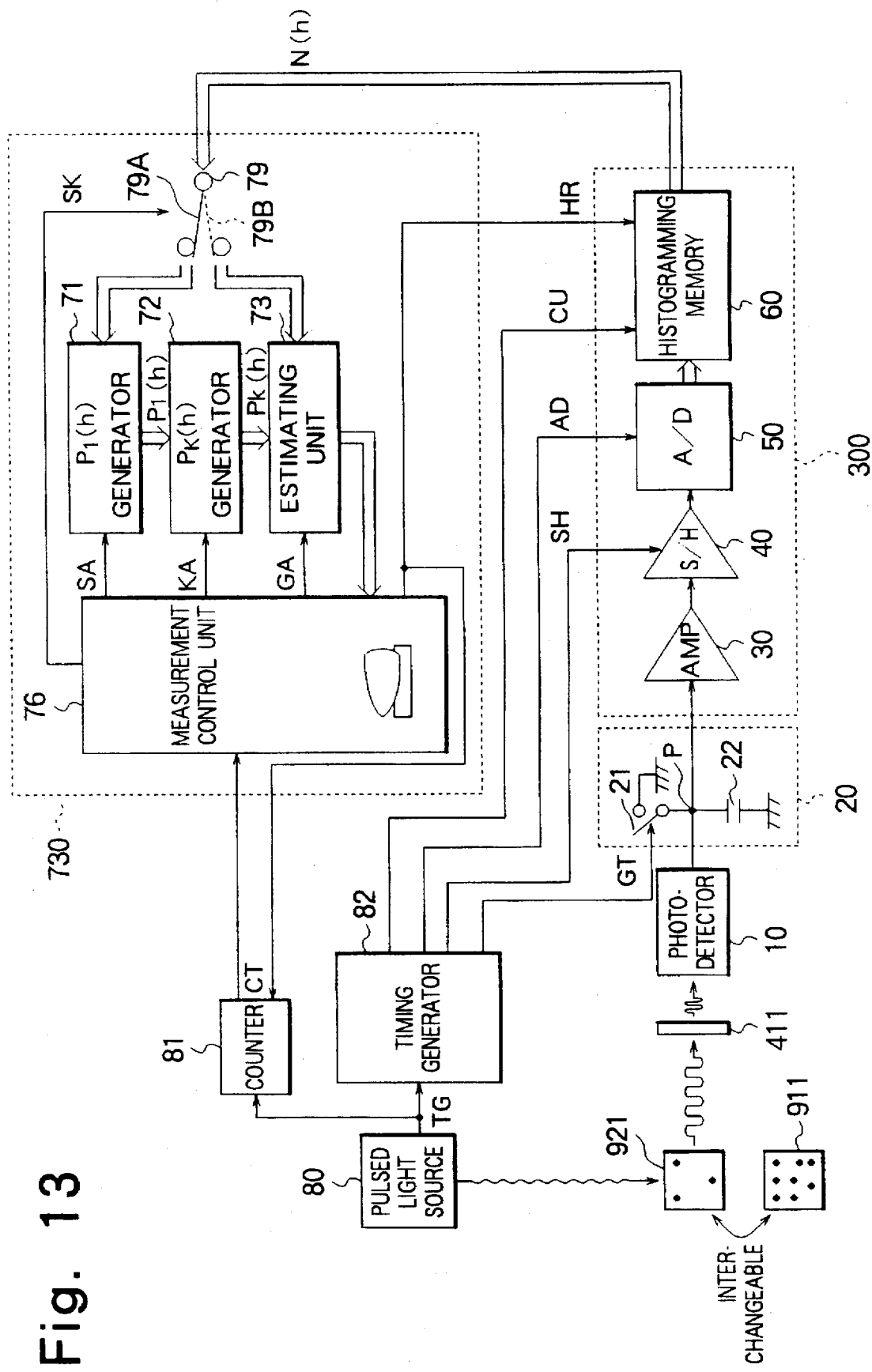
FIG. 13 is a structural drawing of a light measuring apparatus according to Embodiment 3 of the present invention.

FIG. 13 is a structural drawing of Embodiment 3 of the light measuring apparatus according to the present invention. The apparatus of the present embodiment is arranged to measure fluorescence emitted not spontaneously from the measured object but by irradiation with excitation light. Then the fluorescence is measured as measurement-object light.

As shown in FIG. 13, the apparatus of the present embodiment comprises (a) a photodetector 10 for capturing through a wavelength filter 411 the fluorescence from a measurement object 911 or from a calibration sample 921, generated with irradiation of excitation light, emitting photoelectrons in the number according to the photoelectron number distribution depending upon the number of photons of incident light, multiplying the photoelectrons, and outputting them as an electric current signal, (b) an integrator 20 for integrating the current signal output from the photodetector 10 to convert it to a voltage signal and outputting the voltage signal as a pulse height value of one event, (c) a generating section 300 for collecting the pulse height value of each event and generating a pulse height distribution (N(h); h is pulse height values) of event number against pulse height value, (d) a pulsed light source 80 for outputting excitation pulsed light and a generation timing signal TG of the pulsed light, (e) a counter 81 for receiving the generation timing signal TG and counting the number of generation times of the pulsed light of the pulsed light source 80, (f) a timing generating circuit 82 for receiving the generation timing signal TG and outputting operation timing signals (GT, SH, AS, HS, HR) to the integrator 20 and to the generating section 300, and (g) a processing section 730 for collecting the pulse height distribution (N(h)) generated by the generating section 300 to process it and outputting a reset signal HR to the generating section 300 and to the counter 81.

The processing section 730 comprises (i) a generator 71 activated in accordance with an activation instruction signal SA to generate a pulse height distribution ($p_1(h)$) of single photoelectron events, based on the pulse height distribution ($N_1(h)$) generated by the generating section 300, (ii) a generator 72 for generating pulse height distributions ($p_k(h)$) of k-photoelectron events, in each of which the number of photoelectrons emitted in the photodetector 10 is k ($2 \leq k \leq k_{max}$), based on the pulse height distribution ($p_1(h)$) of single photoelectron events, (iii) an estimating unit 73 for estimating a photoelectron number distribution for a case in which the measurement-object light is incident to the photodetector 10, based on a pulse height distribution (N(h)) generated by the generating section 300 when the measurement-object light is incident to the photodetector in the case of setting in the normal measurement mode, the pulse height distribution ($p_1(h)$) of single photoelectron events already obtained, and the pulse height distributions ($p_k(h)$) of k-photoelectron events already obtained, thereby obtaining the intensity of the measurement-object light, (iv) a switch device 79 for receiving the pulse height distribution N(h) output from the generating section 300 and outputting it in an alternative way to the generator 71 or to the estimating unit 73 in accordance with the data direction instruction signal SK, and (v) a measurement control unit 76 for giving an instruction of activation of the generator 71 in the case of the collection mode of single photoelectron events and giving an instruction of activation of the estimating unit 73 in the case of the normal measurement mode, and for outputting the reset signal HR to the generating section 300 and to the counter 81.

The apparatus of the present embodiment measures the intensity of the measurement-object light in the following manner.

Prior to the measurement of the measurement-object light, pulse height distributions for calibration, $p_i(h)$ ($1 \leq i \leq k_{MAX}$), are generated. For generating the pulse height distributions $p_i(h)$, the calibration sample 921 is used.

The measurement control unit 76 first makes the memory reset signal temporarily significant to reset the all contents of the histogramming memory 60 to the count value "0." Then the pulsed light source 80 regularly outputs the excitation pulsed light and the timing signal TG a little earlier than emission of the excitation pulsed light.

The timing generating circuit 82, receiving the timing signal TG, changes the gate signal GT to significant and then awaits arrival of incident light to the photodetector 10.

Figure 14:
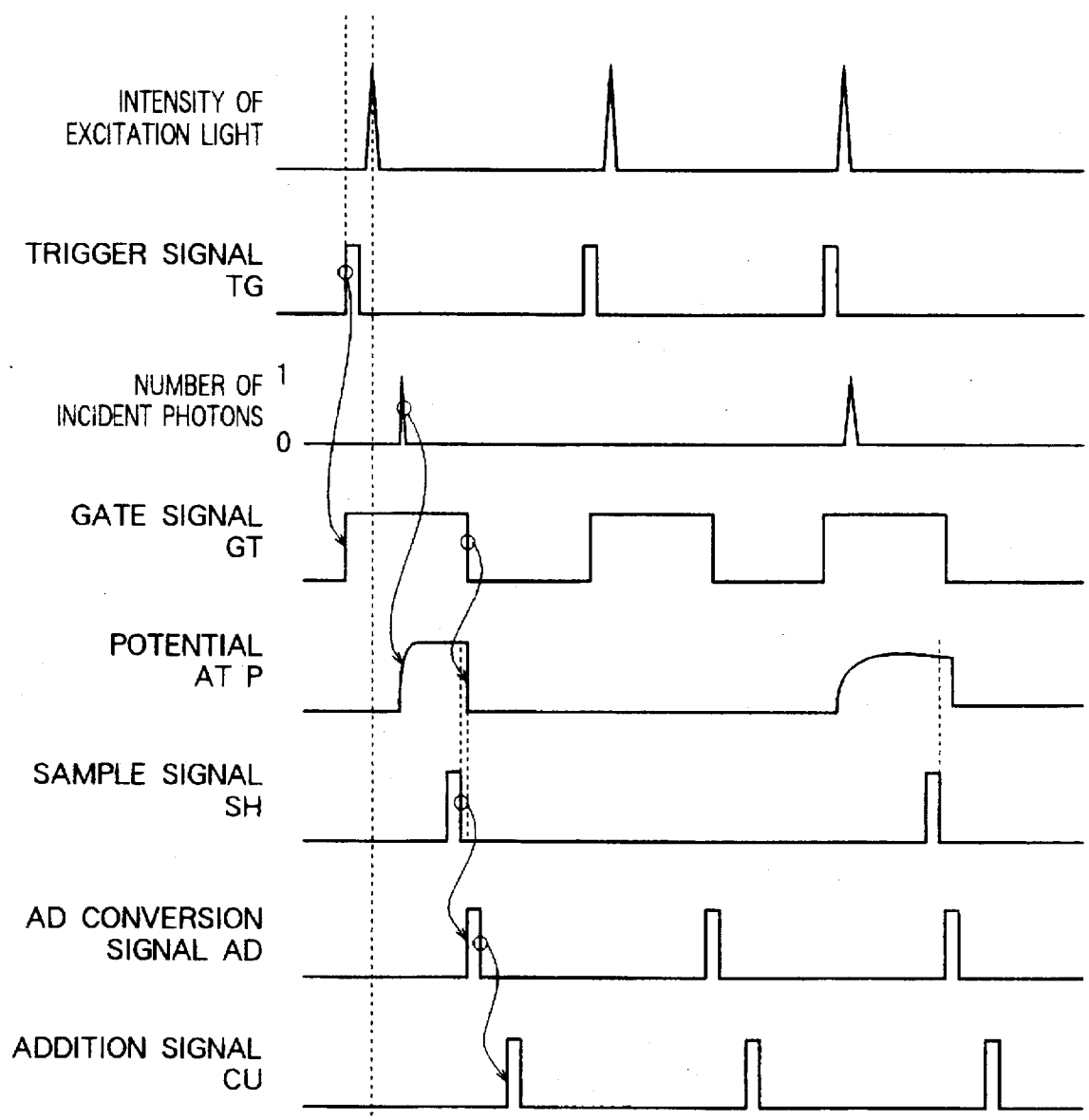
FIG. 14 is a timing chart to illustrate the operation upon collection of single photoelectron events in the light measuring apparatus of Embodiment 3.

The light, generated with irradiation of the calibration sample 921 after the excitation pulsed light is emitted from the pulsed light source 80, is incident through the wavelength filter 410 to the photodetector 10. FIG. 14 is a timing chart to illustrate the operation of from incidence of light to the photodetector 10, to generation of the pulse height distribution $N_1(h)$ output from the generating section 300.

For collecting one event, the timing generating circuit 82 keeps the gate signal GT, which is an integration instruction signal, significant over the time $T_G$. During the significant period of the gate signal GT the switch 21 is kept in an open state and the current signal output from the photodetector 10 is integrated, so as to accumulate charges depending upon the current signal in the capacitor 22. Then the potential is raised at point P in accordance with the charges accumulated, and a voltage signal is output.

The calibration sample 921 is adjusted so that it emits only light of very small quantity and, in most cases, only at most one photon is incident to the photodetector 10 while the gate signal GT is significant. Accordingly, the number of photoelectrons generated in the photoelectric surface 13 during the significant period of gate signal GT is at most 1 in most cases.

The voltage signal output from the integrator 20 is supplied to the generating section 300. In the generating section 300, the amplifier 30 receives the voltage signal output from the integrator 20 to amplify it and supplies the amplified signal to the sample holder 40.

The timing generating circuit 82 makes the sample instruction signal SH significant during the significant period of gate signal GT and changes the sample instruction signal SH from significant to non-significant immediately before the gate signal GT transitions from significant to non-significant.

The sample holder 40 performs sampling in the significant state of sample instruction signal SH and keeps holding in the non-significant state of sample instruction signal SH the voltage value sampled at the time when the sample instruction signal SH transitions from significant to non-significant. Namely, the sample holder 40 keeps outputting the voltage value according to the potential value at point P immediately before transition of gate signal GT from significant to non-significant, after the sample instruction signal SH is changed from significant to non-significant.

The voltage signal output from the sample holder 40 is supplied to the AD converter 50. After the sample instruction signal SH is changed from significant to non-significant, the timing generating circuit 82 makes the AD conversion signal AD temporarily significant to notify the AD converter 50 of an execution instruction of the AD conversion operation. The AD converter 50, instructed to execute the AD conversion operation, converts the input voltage value, which is an analog value, to a digital value and outputs the digital signal carrying a pulse height value in one event.

The digital signal output from the AD converter 50 is supplied to the histogramming memory 60. At a proper time after completion of the AD conversion operation of the AD converter 50, the timing generating circuit 82 makes the addition signal CU temporarily significant to notify the histogramming memory 60 of an addition instruction. The histogramming memory 60, receiving the addition instruction, adds only 1 to the contents at an address according to the pulse height value input.

After completion of the above operation of from change of gate signal GT to significant, to updating of the contents of the histogramming memory 60, the operation of from again changing the gate signal GT to significant, to updating the contents of the histogramming memory 60 is repeated a predetermined number of times, thereby generating the pulse height distribution $N_1^*(h)$ ($0 \leq h \leq h_{MAX}$) inside the histogramming memory 60.

After that, the pulse height distributions $p_i(h)$ are generated in the same manner as in Embodiment 1.

Subsequently, the calibration sample 921 is replaced by the measurement object 911 to measure the measurement-object light from the measurement object 911.

The measurement control unit 76 first makes the reset signal HR temporarily significant to reset the all contents of the histogramming memory 60 and counter 82 to the count value "0." Then the pulsed light source 80 regularly outputs the excitation pulsed light and the timing signal TG a little earlier than emission of the excitation pulsed light.

The counter 81, receiving the timing signal TG, adds only 1 to the contents of the counter. The timing generating circuit 82, receiving the timing signal TG, turns the gate signal GT significant and awaits incidence of the measurement-object light to the photodetector 10.

Figure 15:
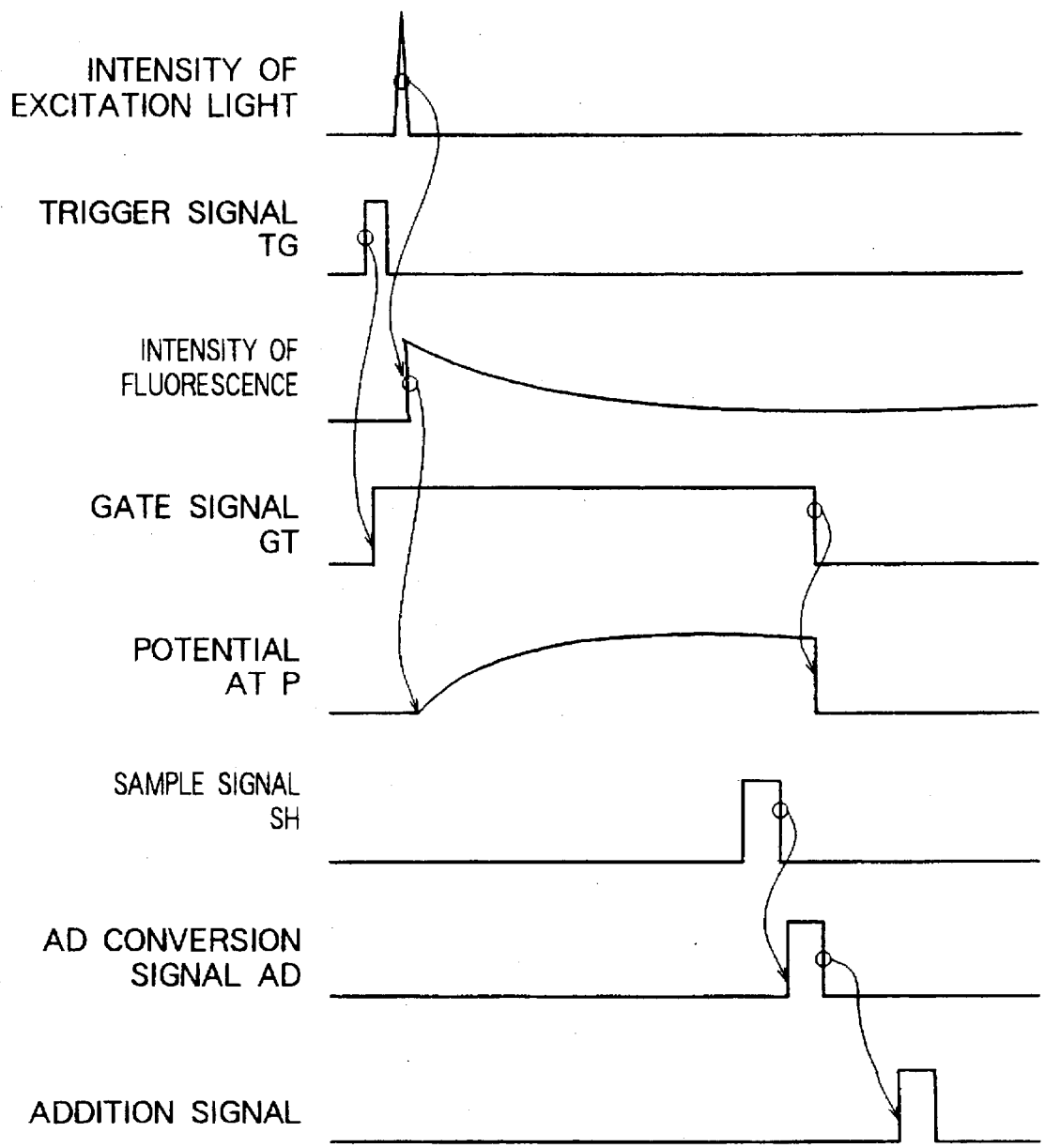
FIG. 15 is a timing chart to illustrate the operation upon measurement of measurement-object light in the light measuring apparatus of Embodiment 3.

The measurement-object light, generated with irradiation of the measurement object 911 after the excitation pulsed light is emitted from the pulsed light source 80, is incident through the wavelength filter 410 to the photodetector 10. FIG. 15 is a timing chart to illustrate the operation of from incidence of light to the photodetector 10, to generation of the pulse height distribution N(h) output from the generating section 300.

The timing generating circuit 82 transfers the gate signal GT to the integrator 20 and transfers the operation timing signals (SH, AD, CU, HR) to the generating section 300, in the same manner as in the case of measurement of single photoelectron events. Accordingly, the integrator 20 and generating section 300 operate in the same manner as in the case of single photoelectron events to generate the pulse height distribution N(h) according to incidence of the measurement-object light, inside the histogramming memory 60.

After the pulse height distribution N(h) is generated as described above, the photoelectron number distribution generated in the photoelectric surface 13 in each event is estimated in the same manner as in Embodiment 1, thus obtaining the intensity of incident light.

(Embodiment 4)

Figure 16:
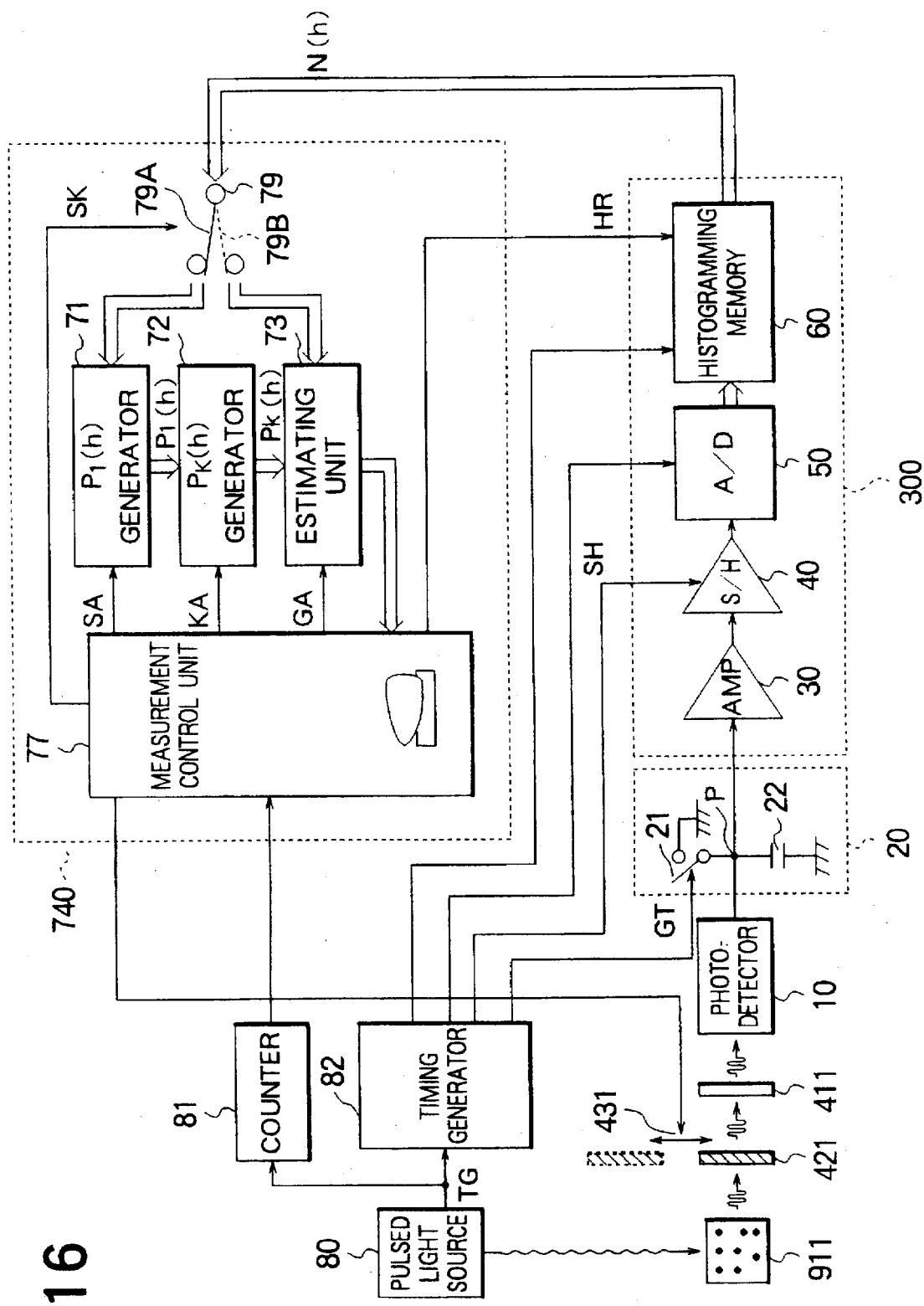
FIG. 16 is a structural drawing of a light measuring apparatus according to Embodiment 4 of the present invention.

FIG. 16 is a structural drawing of Embodiment 4 of the light measuring apparatus according to the present invention. The apparatus of the present embodiment is different from Embodiment 3 in that measurement of the measurement-object light is carried out without a need for the calibration sample. Because of this difference of function, the apparatus of the present embodiment is different from Embodiment 3 of FIG. 13 in that the apparatus further comprises ii) a light reducing filter 421 and (ii) a carrier 431 for moving the light reducing filter 421 in accordance with the light reducing instruction signal DL1 and in that the processing section 740 comprises a measurement control unit 77 for notifying the carrier 431 of the light reducing instruction signal DL1, as shown in FIG. 16. In other words, the present embodiment is one attained by applying the modification from Embodiment 1 to Embodiment 2, to Embodiment 3.

The apparatus of the present embodiment measures the intensity of the measurement-object light in the following manner.

Similarly as in Embodiment 3, the pulse height distributions for calibration, $p_i(h)$ ($1 \leq i \leq k_{MAX}$), are generated prior to the measurement of the measurement-object light. For generating the pulse height distributions $p_i(h)$, the measurement control unit 75 makes the light reducing instruction signal DL1 significant to control the carrier 431, so as to locate the light reducing filter 421 on the optical path before the measurement-object light from the measurement object 910 is incident to the photodetector 10.

After that, the same operation as in Embodiment 3 is carried out to generate the pulse height distributions $p_i(h)$ ($1 \leq i \leq k_{MAX}$).

After the pulse height distributions $p_i(h)$ ($1 \leq i \leq k_{MAX}$) are generated in this way, the measurement control unit 75 makes the light reducing instruction signal DL1 nonsignificant to control the carrier 431 so as to remove the light reducing filter 421 from the optical path before the measurement-object light from the measurement object 910 is incident to the photodetector 10, thereby letting the measurement-object light directly enter the photodetector 10.

After that, the same operation as in Embodiment 3 is carried out to estimate the photoelectron number distribution of photoelectrons occurring in the photoelectric surface 13 with incidence of the measurement-object light, thereby obtaining the intensity of the measurement-object light.

(Embodiment 5)

Figure 17:
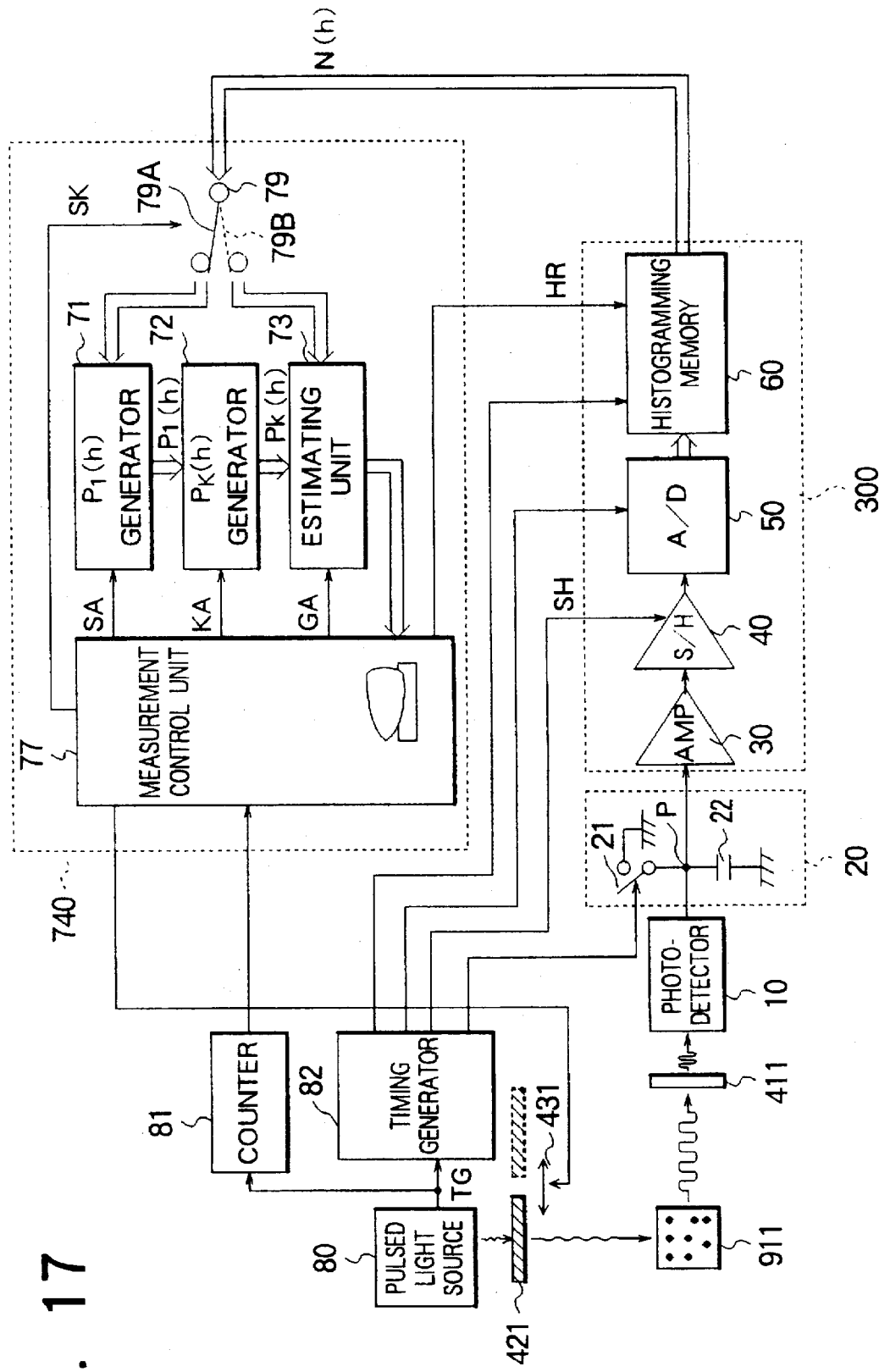
FIG. 17 is a structural drawing of a light measuring apparatus according to Embodiment 5 of the present invention.

FIG. 17 is a structural drawing of Embodiment 5 of the light measuring apparatus according to the present invention. The apparatus of the present embodiment is also different from Embodiment 3 in that measurement of the measurement-object light is carried out without a need for the calibration sample similarly as Embodiment 4. Because of this difference of function, the apparatus of the present embodiment is different from Embodiment 3 of FIG. 13 in that the apparatus further comprises (i) a light reducing filter 421 and (ii) a carrier 431 for moving the light reducing filter 421 in accordance with the light reducing instruction signal DL1 and in that the processing section 740 comprises a measurement control unit 77 for notifying the carrier 431 of the light reducing instruction signal DL1, as shown in FIG. 17. Further, the apparatus of the present embodiment is different from Embodiment 4 in that the light reducing filter 421 is used not for reduction of the measurement-object light, but for reduction of the excitation light.

The apparatus of the present embodiment measures the intensity of the measurement-object light in the following manner.

Similarly as in Embodiment 3, the pulse height distributions for calibration, $p_i(h)$ ($1 \leq i \leq k_{MAX}$), are generated prior to the measurement of the measurement-object light. For generating the pulse height distributions $p_i(h)$, the measurement control unit 77 makes the light reducing instruction signal DL1 significant to control the carrier 431, so as to locate the light reducing filter 421 on the optical path before the excitation pulsed light from the pulsed light source 80 is incident to the measurement object 911.

After that, the same operation as in Embodiment 3 is carried out to generate the pulse height distributions $p_i(h)$ ($1 \leq i \leq k_{MAX}$).

After the pulse height distributions $p_i(h)$ ($1 \leq i \leq k_{MAX}$) are generated in this way, the measurement control unit 75 makes the light reducing instruction signal DL1 nonsignificant to control the carrier 431 so as to remove the light reducing filter 421 from the optical path before the excitation pulsed light from the pulsed light source 80 is incident to the measurement object 911, thereby letting the measurement-object light enter the measurement object 911.

After that, the same operation as in Embodiment 3 is carried out to estimate the photoelectron number distribution of photoelectrons occurring in the photoelectric surface 13 with incidence of the measurement-object light, thereby obtaining the intensity of the measurement-object light.

Figure 18:
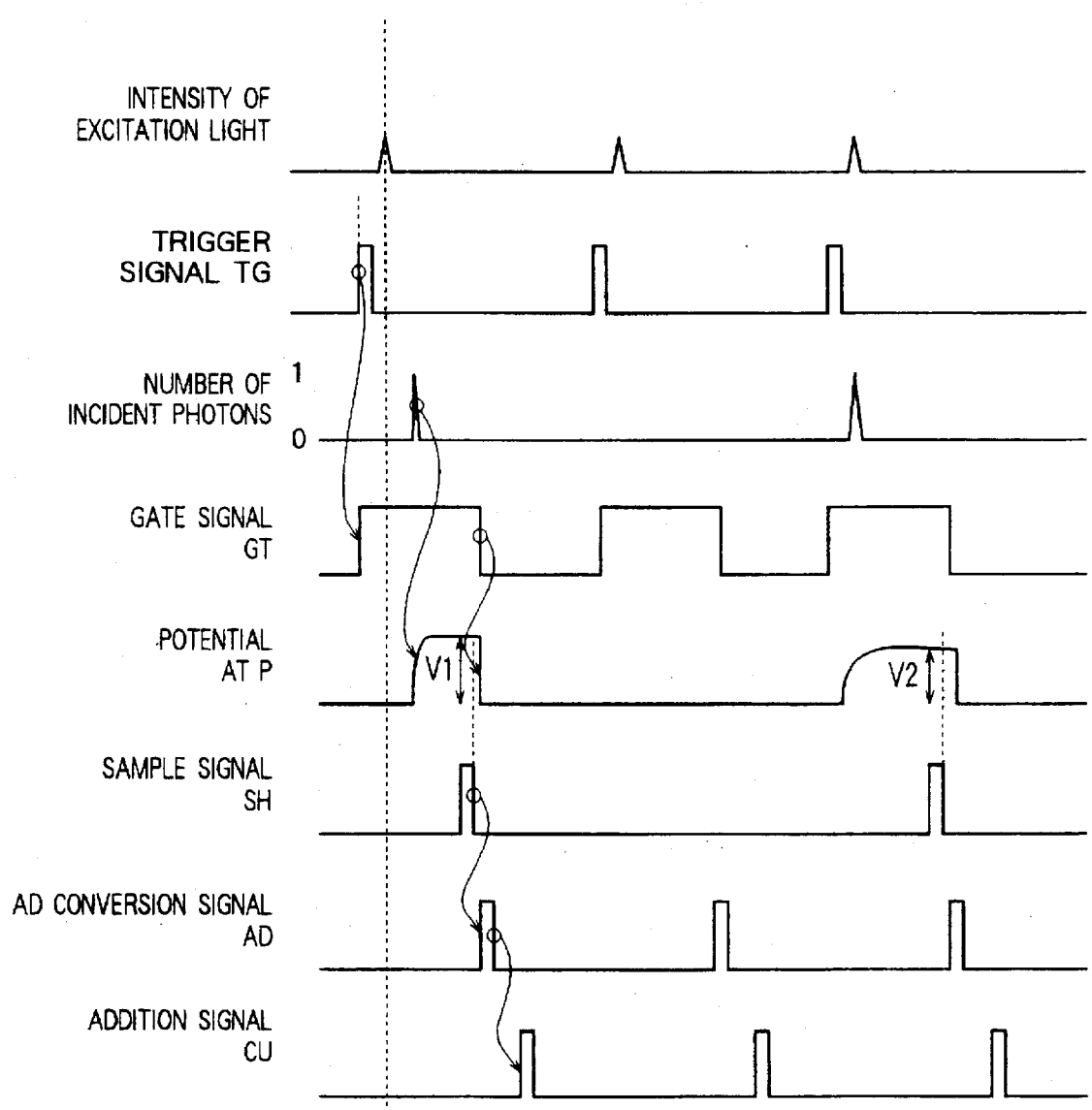
FIG. 18 is a timing chart to illustrate the operation upon collection of single photoelectron events in the light measuring apparatus of Embodiment 5.
Figure 19:
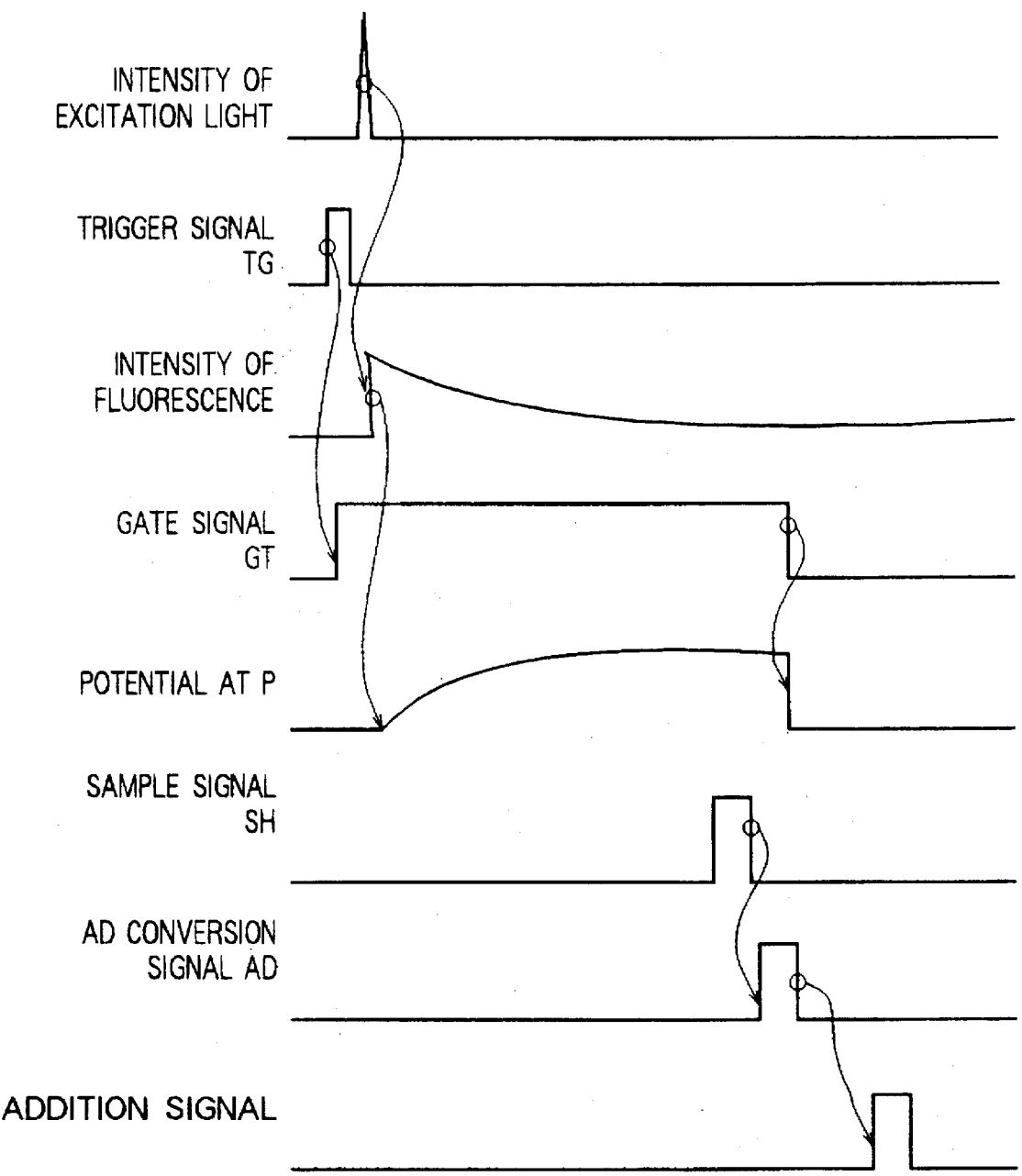
FIG. 19 is a timing chart to illustrate the operation upon measurement of measurement-object light in the light measuring apparatus of Embodiment 5.

FIG. 18 is a timing chart to illustrate the operation of from incidence of light to the photodetector 10 in the case of collection of single photoelectron events, to generation of the pulse height distribution $N_1(h)$ output from the generating section 300, and FIG. 19 is a timing chart to illustrate the operation of from incidence of the measurement-object light to the photodetector 10, to generation of the pulse height distribution N(h) in the generating section 300. The timings shown in FIG. 18 and FIG. 19 are the same as those in FIG. 14 and FIG. 15, but they are attached in order to show states of increase and decrease of the excitation light.

Since the quantity of irradiation light upon collection of single photoelectron events in the present embodiment can be smaller than that in Embodiment 4, the present embodiment can restrict change in properties of the measurement object due to bleaching more than Embodiment 4.

(Embodiment 6)

Figure 20:
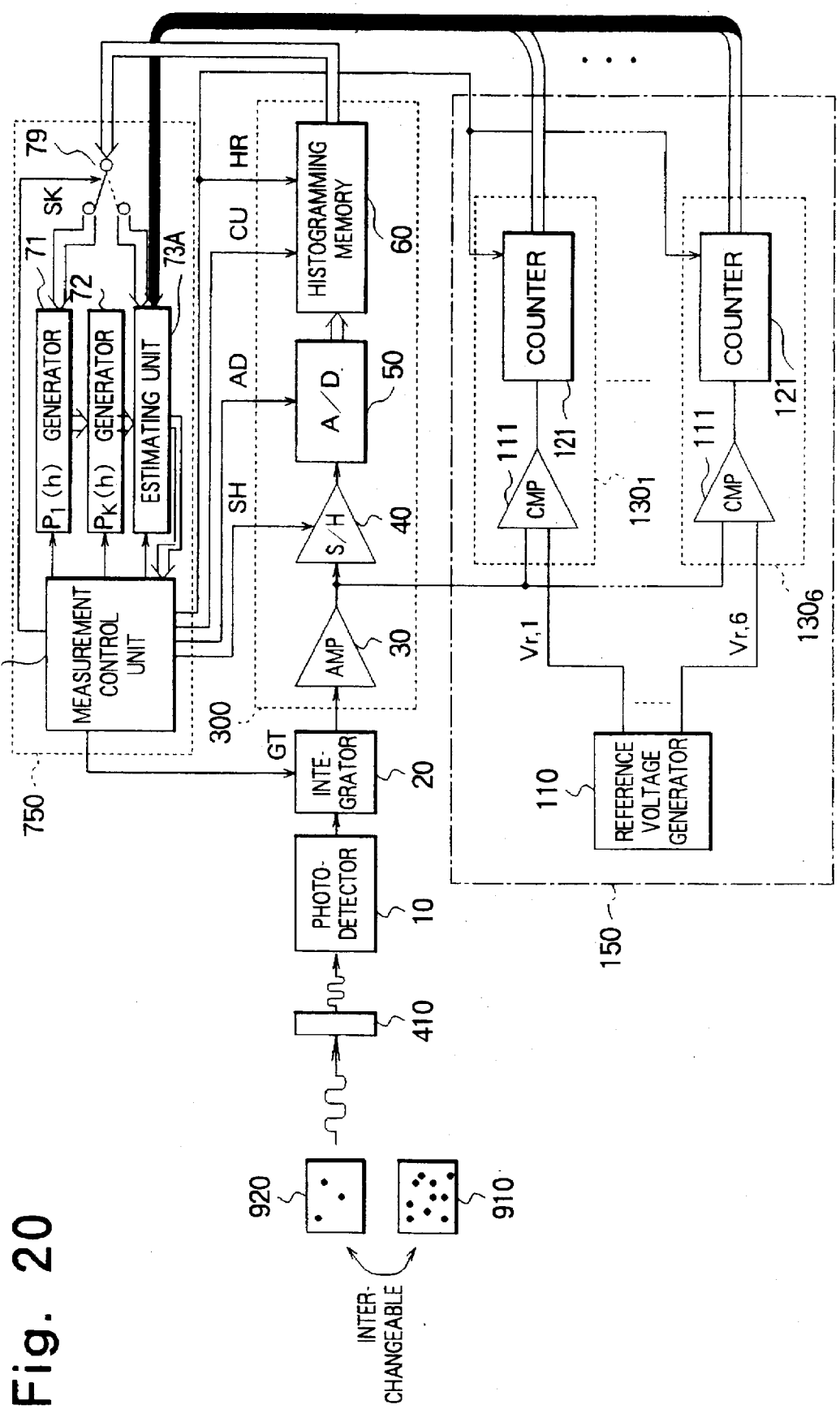
FIG. 20 is a structural drawing of a light measuring apparatus according to Embodiment 6 of the present invention.

FIG. 20 is a structural drawing of Embodiment 6 of the light measuring apparatus according to the present invention. As shown in FIG. 20, the apparatus of the present embodiment is different from the apparatus of Embodiment 1 in that the apparatus further comprises a comparison counting section 150 for comparing a voltage value of the voltage signal output from the amplifier 30 with a predetermined number of (six in the present embodiment) mutually different reference voltage values and for counting the respective comparison results and in that the processing section 750 comprises an estimation unit 73A, replacing the estimation unit 73, for estimating a photoelectron number distribution for a case where the measurement-object light is incident to the photodetector 10, based on the counting results by the comparison counting section 150 when the measurement-object light is incident to the photodetector upon measurement of the measurement-object light, the pulse height distribution of single photoelectron events ($p_1(h)$) already obtained, and the pulse height distributions of k-photoelectron events ($p_k(h)$) already obtained, thereby obtaining the intensity of the measurement-object light.

The comparison counting section 150 comprises (i) a reference voltage generator 110 for outputting six types of reference voltages $V_{r,1}$ to $V_{r,6}$ and (ii) comparison counting devices $130_i$ for comparing the voltage signal from the amplifier 30 with $V_{r,i}$ ($i=1$ to 6) and for carrying out counting when the voltage value of the voltage signal from the amplifier 30 is greater than $V_{r,i}$.

Each comparison counting device $130_i$ comprises (i) a comparator 111 for comparing the voltage value as receiving the voltage signal from the amplifier 30, with $V_{r,i}$ ($i=1$ to 6) and for outputting the comparison results in binary voltage levels, and (ii) a counter 121 for counting up with change of the output voltage from the comparator 111 in accordance with change of from a state wherein the voltage value of the voltage signal from the amplifier 30 is smaller than $V_{r,i}$ to a state wherein the voltage value of the voltage signal from the amplifier 30 is greater than $V_{r,i}$.

The apparatus of the present embodiment measures the intensity of the measurement-object light in the following manner.

Prior to the measurement of the measurement-object light, the pulse height distributions for calibration, $p_i(h)$ ($1 \leq i \leq k_{MAX}$), are generated in the same manner as in Embodiment 1.

Next, values of $V_{r,i}$ are determined in accordance to the pulse height distributions for calibration $p_i(h)$ ($1 \leq i \leq k_{MAX}$) and the reference voltage generator 110 outputs the voltages $V_{r,i}$.

Figure 21:
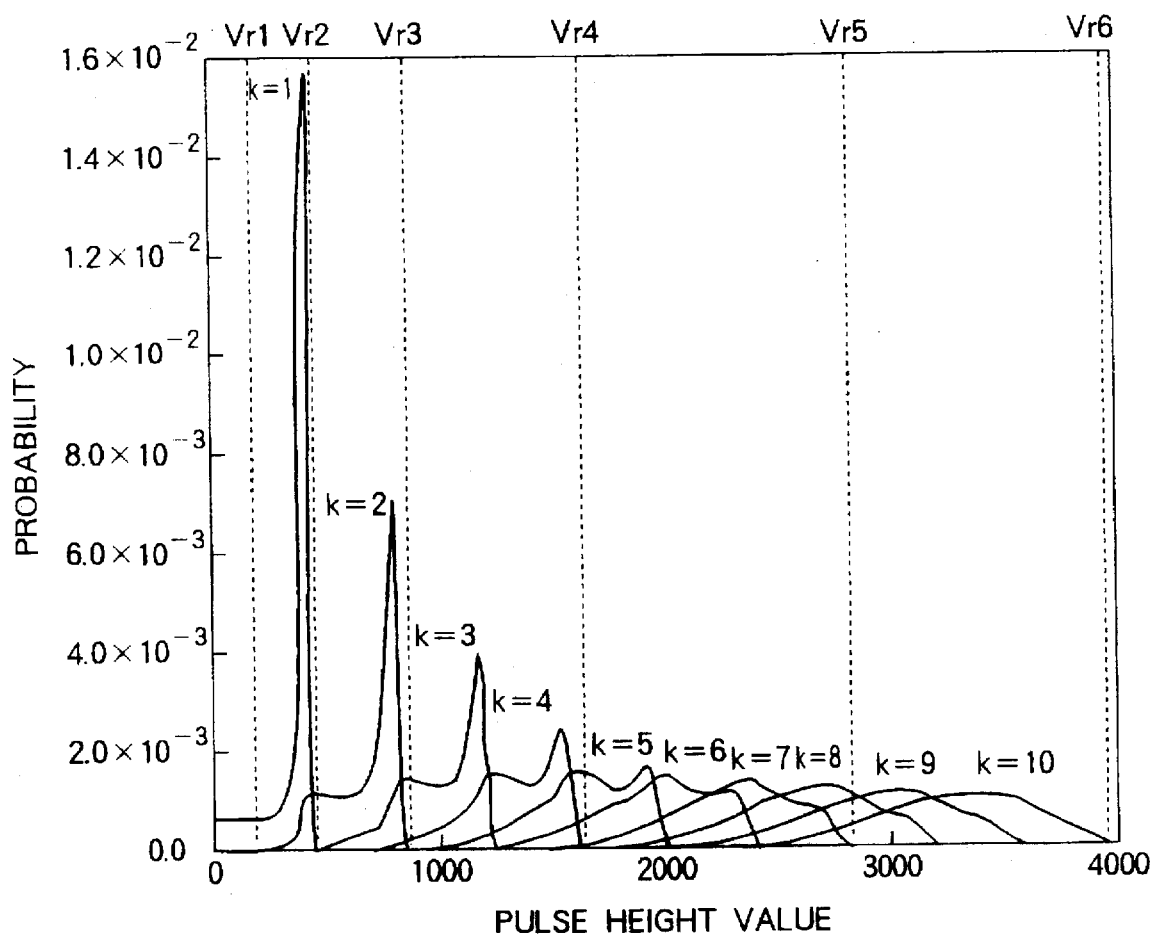
FIG. 21 is a drawing to show the pulse height distributions $p_k(h)$ of k-photoelectron events and reference voltages $V_{r,1} - V_{r,6}$.

FIG. 21 is a drawing to show each of the pulse height distributions of k-photoelectron events $p_i(h)$ (i=1, 2, 3, ... , $k_{MAX}$) generated above, taking account of the influence of the noise which the light measuring apparatus inherently has. In this figure, $k_{MAX}$=10. FIG. 21 also indicates dashed lines representing the pulse height values respectively corresponding to the reference voltages Vr,1 to Vr,6 in the present embodiment.

The reference voltages Vr,1 to Vr,6 supplied to one input terminals of the respective comparators 111 to 116 from the reference voltage generator 110 are determined, for example, as described below, based on the pulse height distributions of k-photoelectron events $p_k(h)$ (k=1, 2, 3, ... , $k_{MAX}$). Namely, the reference voltage Vr,1 supplied to the comparison counting device 130₁ is set to a voltage value corresponding to a pulse height value larger than noise components superimposed on the low-peak-height portion of the pulse height distribution of single photoelectron events $p_1(h)$ and smaller than the low-peak-height-side base of peak of the pulse height distribution of single photoelectron events $p_1(h)$. The reference voltage Vr,2 supplied to the comparison counting device 130₂ is set to a voltage value corresponding to a pulse height value near the high-peak-height-side base of the pulse height distribution of single photoelectron events $p_1(h)$. The reference voltage Vr,3 supplied to the comparison counting device 130₃ is set to a voltage value corresponding to a pulse height value near the high-peak-height-side base of the pulse height distribution of 2-photoelectron events $p_2(h)$. The reference voltage Vr,4 supplied to the comparison counting device 130₄ is set to a voltage value corresponding to a pulse height value near the high-peak-height-side base of the pulse height distribution of 4-photoelectron events $p_4(h)$. The reference voltage Vr,5 supplied to the comparison counting device 130₅ is set to a voltage value corresponding to a pulse height value near the high-peak-height-side base of the pulse height distribution of 7-photoelectron events $p_7(h)$. The reference voltage Vr,6 supplied to the comparison counting device 130₆ is set to a voltage value corresponding to a pulse height value near the high-peak-height-side base of the pulse height distribution of 10-photoelectron events $p_{10}(h)$.

When the relation between the pulse height value h and the output voltage Vout from the amplifier 30 is expressed as Vout=V(h) and when the reference voltages Vr,1 to Vr,6 are obtained based on the pulse height distributions of k-photoelectron events $p_k(h)$ (k=1, 2, 3, ... , 10) shown in FIG. 21, Vr,1=V($h_1$=151), Vr,2=($h_2$438), Vr,3=V($h_3$=847), Vr,4=V($h_4$=1650), Vr,5=V($h_5$=2839), and Vr,6=V($h_6$=4001). The reference voltages Vr,1 to Vr,6 set in this manner are output each from the reference signal generator 110 to be supplied to the comparison counting devices 130₁ to 130₆, respectively.

Subsequently, the calibration sample 920 is replaced by the measurement object 910 and then the measurement-object light from the measurement object 910 is measured.

The measurement control unit 74 first makes the reset signal HR temporarily significant to reset the all contents of the histogramming memory 60 and counter 121 to the count value "0."

Figure 22:
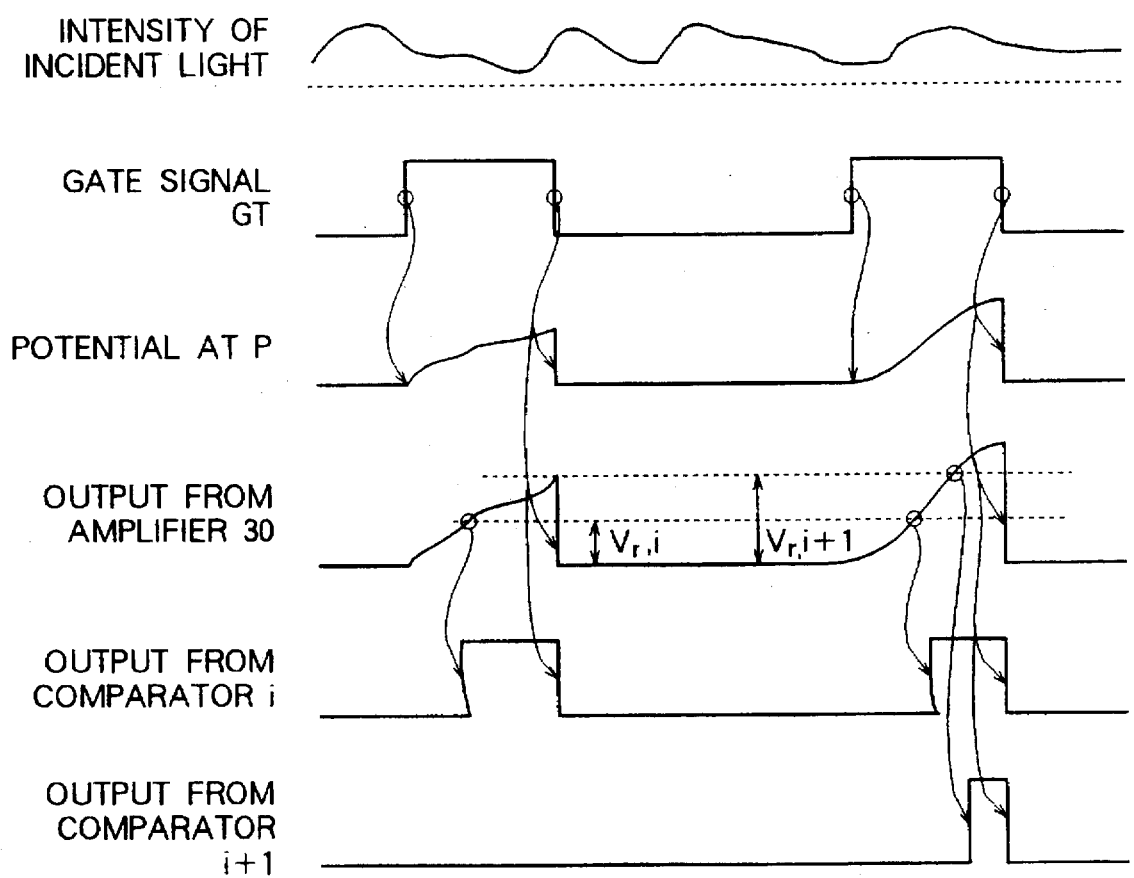
FIG. 22 is a timing chart to illustrate the operation upon measurement of measurement-object light in the light measuring apparatus of Embodiment 6.

FIG. 22 is a timing chart to illustrate the operation of comparison counting in the comparison counting section 150. For measuring the measurement-object light, the measurement control unit 74 makes the gate signal GT significant. When the measurement-object light is incident to the photodetector 10 during the significant period of the gate signal GT so as to generate photoelectrons in the photoelectric surface 13, the detector 10 outputs a current signal. The current signal output from the detector 10 is integrated by the integrator 20 over the significant period of the gate signal GT to be converted to a voltage signal, and the voltage signal is output.

The voltage signal output from the integrator 20 is amplified by the amplifier 30 and thereafter the amplified signal is supplied to the comparison counting section 150.

The comparison counting section 150 compares the voltage value of the voltage signal supplied from the amplifier 30 with each of the reference voltages $V_{r,1}$ to $V_{r,6}$ and each comparison counting device 130₁ to 130₆ counts up when the voltage value of the voltage signal is greater than the reference voltage $V_{r,1}$ to $V_{r,6}$.

After completion of generation of counting in the comparison counting devices 130₁ to 130₆ in this manner, the photoelectron number distribution of photoelectrons occurring in the photoelectric surface 13 is estimated, thus obtaining the intensity of the measurement-object light.

For estimating the photoelectron number distribution, the measurement control unit 74 makes the activation instruction signal GA significant, thereby activating the estimation unit 73A.

The estimation unit 73A thus activated collects the count values Cm (m=1 to 6) from the comparison counting unit 150.

For example, the maximum likelihood method is used for estimating the distribution of numbers of photoelectrons (photoelectron number distribution) emitted in the photoelectric surface 13 of photodetector 10 with reception of the measurement-object light. Namely, letting $q_k$ (k=1, 2, 3, ... , K) be a probability of occurrence of each of k-photoelectron events and $q_0$ be a probability of emission of no photoelectron from the photoelectric surface 13 (zero probability), $q_k$ (k=0, 1, 2, ... , K) to maximize the logarithmic likelihood defined by the following equation is obtained, which is used as an estimate photoelectron number distribution.

$$\log L \left( N - \sum_{m=1}^{M} n_m \right) - \log(p_{ND}) + \sum_{m=1}^{M} n_m \cdot \log(p_m) \quad (11)$$

Here, N is the number of measurements, which is the number of total excitations in the case of measurement of fluorescence intensity by pulse excitation. Further, $n_m$, $p_{ND}$, and $p_m$ each are defined as follows.

$$n_m = C_m - C_{m+1}, (m = 1, 2, \ldots, M-1) \quad (12a)$$
$$n_M = C_M \quad (12b)$$

$$p_{ND} = q_0 + \sum_{n=0}^{h-1} \sum_{k=1}^{k_{max}} q_k \cdot p_k(h) \quad (13)$$

$$p_m = \sum_{h=n_m}^{h_{m-1}-1} \sum_{k=1}^{k_{max}} q_k \cdot p_k(h), (m = 1, 2, \ldots, M-1) \quad (14a)$$

$$p_M = 1 - q_0 - \sum_{n=0}^{h_M-1} \sum_{k=1}^{k_{max}} q_k \cdot p_k(h) \quad (14b)$$

Here, the shape of the photoelectron number distribution can be assumed in an arbitrary shape within the scope in which the number of population parameters is smaller than the number of counters (six in this case), but a Poisson distribution is assumed in the following description. When the photoelectron number distribution is assumed to be a Poisson distribution, the probabilities $q_k$ (k=1, 2, 3, ..., K) of occurrence of respective k-photoelectron events are expressed by Eq. (10). Here, $\lambda$ is a mean value of numbers of photoelectrons emitted from the photoelectric conversion surface 13. In this case, obtaining the photoelectron number distribution to maximize the logarithmic likelihood is equivalent to obtaining the $\lambda$ value to maximize the logarithmic likelihood, which can be obtained by numerical computation, for example, such as the golden section method.

In this case, a step function is assumed as relation between the pulse height value h of the voltage signal input and the probability of output of logical pulse signal in each of comparators 111 to 116. However, if the probability of output of logical pulse signal against the pulse height value h of voltage signal is given by a more general form, $\eta_m(h)$ (m=1, 2, 3, ..., M), above Eq. (13) and Eq. (14) are replaced by the following equations.

$$p_{ND} = q_0 + \sum_{n=0}^{h_{max}} \{1 - \eta_1(h)\} \sum_{k=1}^{k_{max}} q_k \cdot p_k(h) \quad (15)$$

$$p_m = \sum_{n=0}^{k_{max}} \{\eta_m(h) - \eta_{m+1}(h)\} \sum_{k=1}^{k_{max}} q_k \cdot p_k(h), \quad (16a)$$

$$(m = 1, 2, \ldots, M - 1)$$

$$p_M = 1 - q_0 - \sum_{n=0}^{h_{max}} \{1 - \eta_M(h)\} \sum_{k=1}^{k_{max}} q_k \cdot p_k(h) \quad (16b)$$

Figure 23:
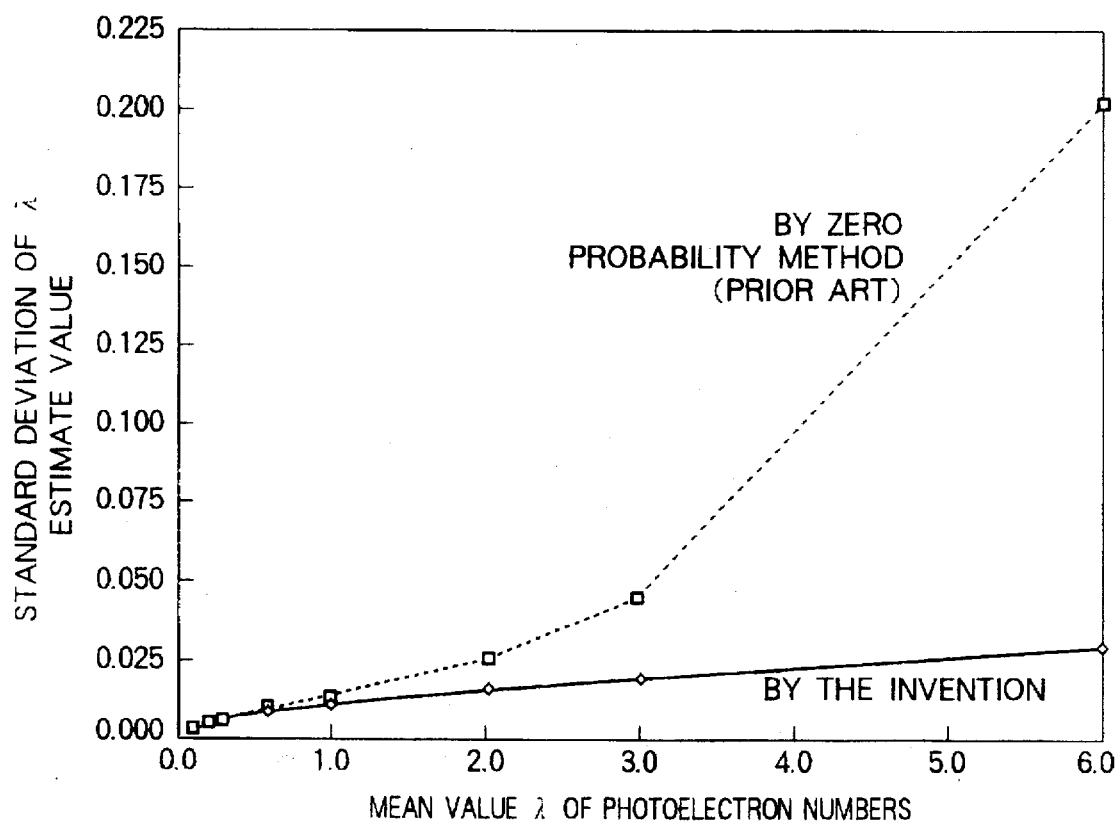
FIG. 23 is a drawing to show the results of theoretical comparison between the light measuring apparatus of Embodiment 6 and the conventional technology (the estimation method utilizing the zero probability) as to estimation errors of the mean value $\lambda$ of photoelectron numbers.

Next described is the theoretical comparison between the light measuring apparatus according to Embodiment 6 and the conventional technology (the estimation method utilizing the zero probability) as to the estimation errors of mean value $\lambda$ of photoelectron numbers. FIG. 23 is a drawing to show the results of comparison between the estimation method by the present embodiment and the estimation method utilizing the zero probability.

Under such conditions that the mean value $\lambda_0$ of numbers of photoelectrons emitted from the photoelectric surface of photodetector was 0.1, 0.2, 0.3, 0.6, 1.0, 2.0, 3.0, or 6.0 and that the measurement number N was 10000, 500 pulse height distributions were generated for each value by simulation calculation and, using them, the mean value $\lambda$ of photoelectron numbers was estimated by each of the techniques and standard deviations of distributions of estimate values were obtained. In FIG. 23 marks ◇ indicate theoretical values of standard deviation of the distribution of estimate $\lambda$ values in the case of use of the light measuring apparatus according to Embodiment 2 and marks □ indicate theoretical values of standard deviation of the distribution of estimate $\lambda$ values in the case of the estimation method utilizing the zero probability.

It is seen from FIG. 23 that the mean value $\lambda$ of photoelectron numbers can be estimated with higher accuracy by the light measuring apparatus according to Embodiment 6 rather than by the estimation method utilizing the zero probability. Particularly, after the mean value $\lambda$ of photoelectron numbers exceeds 0.6, the difference between the standard deviations of distribution of estimate $\lambda$ values by the respective estimation methods becomes greater as the mean value $\lambda$ increases. Namely, use of the light measuring apparatus according to Embodiment 6 permits accurate estimation of the mean value $\lambda$ even if the mean value $\lambda$ of numbers of photoelectrons emitted from the photoelectric conversion surface 13 with incidence of the measurement-object light to the photodetector 10, is large, whereby the quantity of incident light can be obtained with accuracy.

Since the light measuring apparatus of the present embodiment does not use the AD converter 50 incapable of performing high-speed operation for measuring the light quantity of the measurement-object light, the sampling can be repeated at higher speed than in the light measuring apparatus of Embodiment 1. For example, the repetition of sampling can be enhanced up to the high speed of about 10 MHz.

The present embodiment can be modified in the same manner as the modification of from Embodiment 1 to Embodiment 2.

(Embodiment 7)

Figure 24:
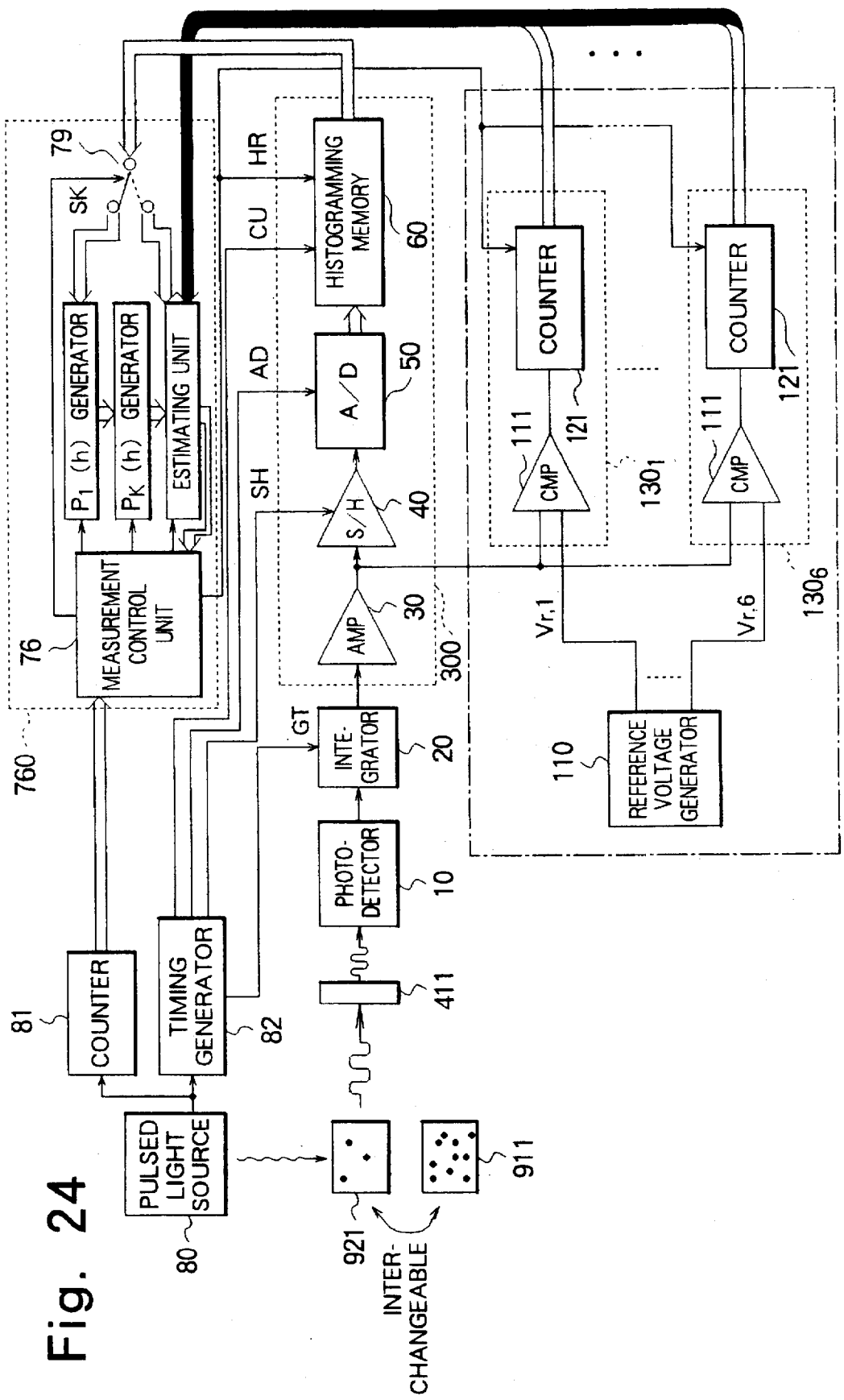
FIG. 24 is a structural drawing of a light measuring apparatus according to Embodiment 7 of the present invention.

FIG. 24 is a structural drawing of Embodiment 7 of the light measuring apparatus according to the present invention. The apparatus of the present embodiment is arranged similar to Embodiment 3 so that fluorescence is emitted not by spontaneous emission of the measurement object, but by irradiation of excitation light. Then the fluorescence is measured as measurement-object light.

As shown in FIG. 24, the apparatus of the present embodiment is different from the apparatus of Embodiment 3 in that the apparatus further comprises the comparison counting section 150 for comparing a voltage value of the voltage signal output from the amplifier 30 with a predetermined number of (six in the present embodiment) mutually different reference voltage values and for counting the respective comparison results and in that the processing section 760 comprises an estimation unit 73A, replacing the estimation unit 73, for estimating a photoelectron number distribution for a case where the measurement-object light is incident to the photodetector 10, based on the counting results by the comparison counting section 150 when the measurement-object light is incident to the photodetector upon measurement of the measurement-object light, the pulse height distribution of single photoelectron events ($p_1(h)$) already obtained, and the pulse height distributions of k-photoelectron events ($p_k(h)$) already obtained, thereby obtaining the intensity of the measurement-object light.

The apparatus of the present embodiment measures the intensity of the measurement-object light in the following manner.

Prior to the measurement of the measurement-object light, the pulse height distributions for calibration, $p_i(h)$ ($1 \leq i \leq k_{MAX}$), are generated in the same manner as in Embodiment 3.

Next, similarly as in Embodiment 6, values of $V_{r,i}$ are determined in accordance to the pulse height distributions for calibration $p_i(h)$ ($1 \leq i \leq k_{MAX}$) and the reference voltage generator 110 outputs the voltages $V_{r,i}$. Subsequently, the calibration sample 921 is replaced by the measurement object 911 and then the measurement-object light from the measurement object 911 is measured.

The measurement control unit 74 first makes the reset signal HR temporarily significant to reset the all contents of the histogramming memory 60 and counter 121 to the count value "0."

Figure 25:
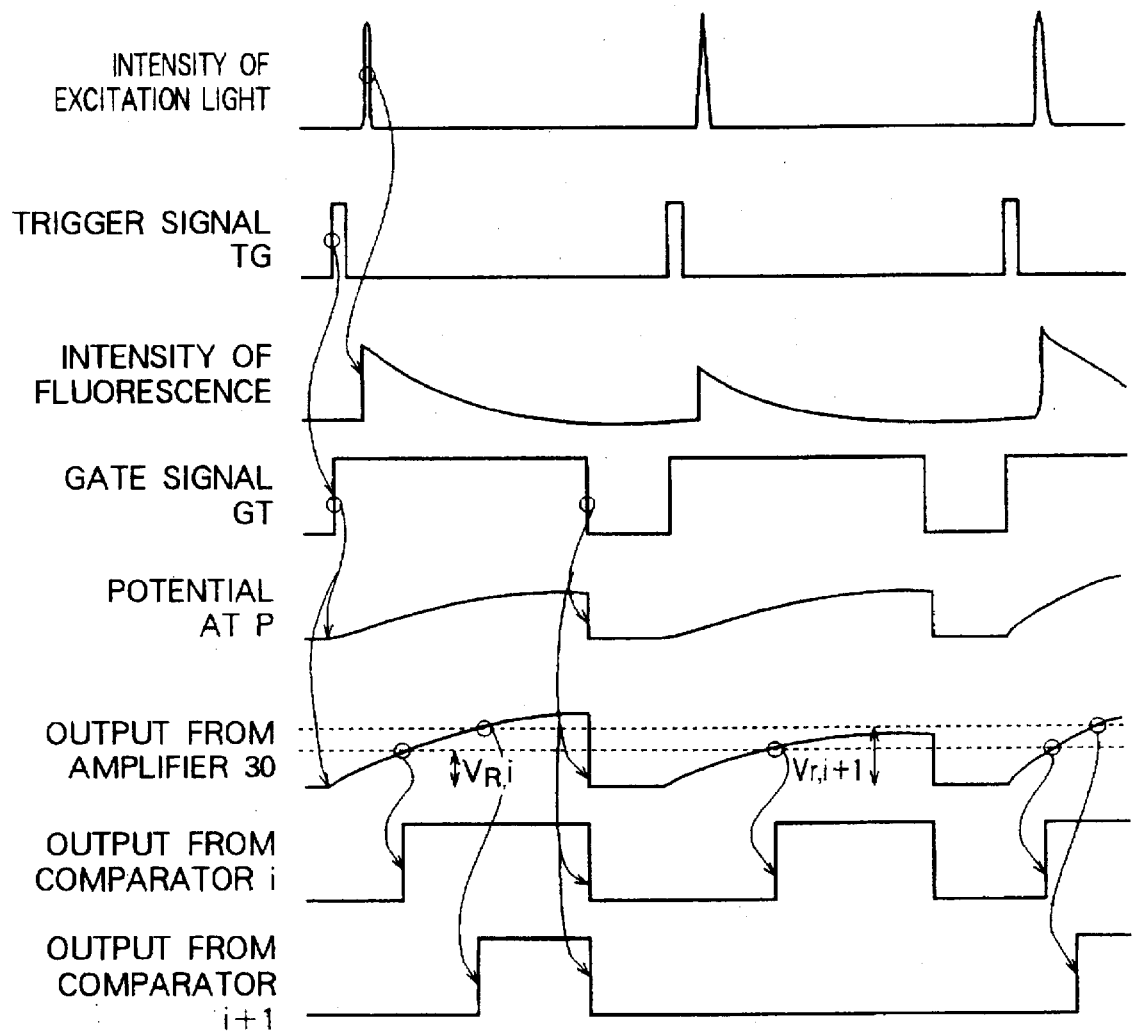
FIG. 25 is a timing chart to illustrate the operation upon measurement of measurement-object light in the light measuring apparatus of Embodiment 7.

FIG. 25 is a timing chart to illustrate the operation of comparison counting in the comparison counting section 150. For measuring the measurement-object light, the measurement control unit 74 makes the gate signal GT significant. When the measurement-object light is incident to the photodetector 10 during the significant period of the gate signal GT so as to generate photoelectrons in the photoelectric surface 13, the detector 10 outputs a current signal. The current signal output from the detector 10 is integrated by the integrator 20 over the significant period of the gate signal GT to be converted to a voltage signal, and the voltage signal is output.

The voltage signal output from the integrator 20 is amplified by the amplifier 30 and thereafter the amplified signal is supplied to the comparison counting section 150.

The comparison counting section 150 compares the voltage value of the voltage signal supplied from the amplifier 30 with each of the reference voltages $V_{r,1}$ to $V_{r,6}$ and each comparison counting device $130_1$ to $130_6$ counts up when the voltage value of the voltage signal is greater than the reference voltage $V_{r,1}$ to $V_{r,6}$.

After completion of counting in the comparison counting devices $130_1$ to $130_6$ in this manner, the photoelectron number distribution of photoelectrons occurring in the photoelectric surface 13 is estimated, thus obtaining the intensity of the measurement-object light.

Since the light measuring apparatus of the present embodiment does not use the AD converter 50 incapable of performing high-speed operation for measuring the light quantity of the measurement-object light, the excitation of the sample 911 by the pulsed laser source 80 can be repeated at higher speed than in the light measuring apparatus of Embodiment 3. The maximum of repetition rate of this excitation is determined by fluorescence lifetime of the fluorescent substance included in the sample 911. For example, supposing the fluorescenece lifetime is 10 ns and integration period of time in the integrator 20 is 50 ns, the repetition of excitation can be enhanced up to the high speed of about 10 MHz.

The present embodiment can also be modified in the same manner as the modifications of from Embodiment 3 to Embodiments 4, 5.

The present invention may have a variety of modifications without having to be limited to the above embodiments. For example, if a beam to be measured is of a pulsed shape, the integrator is not limited to the combination of a capacitor with a switch, but may be a combination of a charge sensitive preamplifier with a waveform shaping amplifier as popularly used in the field of radiation detection.

The pulse height distribution generator is not limited to those comprising the AD converter and histogramming memory. For example, a reference voltage Vr is supplied to one input terminal of a comparator and the voltage signal output from the amplifier 30 is supplied to the other input terminal. Then this reference voltage Vr is scanned to obtain count values $N_i$ of the counter for a constant time for respective values $Vr_i$ of reference voltage, and the pulse height distribution is defined as differences $N_i-N_{i+1}$ of the count values $N_i$. In this case, $(Vr_i+Vr_{i+1})/2$ corresponds to the pulse height value h (where i=1, 2, 3, . . . ).

The light measuring apparatus according to the present invention can be applied to other applications than the measurement of fluorescence generated in the pulsed shape as described above. For example, the apparatus can measure a light quantity of a beam generated continuously. In this case, the integrator 20 of the light measuring apparatus repetitively carries out integration over a constant time. Then, in the light measuring apparatus of Embodiment 1, the sample hold circuit 40 and AD converter 50 operate in synchronization with the operation of integrator 20 and, based on the pulse height distribution generated in the histogramming memory 60 after completion of the predetermined number of integration operations in the integrator 20, the distribution of numbers of photoelectrons emitted in the photodetector 10 is estimated in the same manner as in the above description of Embodiment 1. Then the light quantity of the beam to be measured can be obtained based on this estimate value. In the case of the light measuring apparatus of Embodiment 6, based on count values of the counters 121 after completion of the predetermined number of integration operations in the integrator 20, the distribution of numbers of photoelectrons emitted in the photodetector is estimated in the same manner as in the above description of Embodiment 6, whereby the light quantity of the beam to be measured can be obtained based on this estimate value.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 296902/1995 filed on Nov. 15, 1995 and No. 146220/1996 filed on Jun. 7, 1996 are hereby incorporated by reference.

What is claimed is:

1. A light measuring apparatus comprising:

a photodetector for emitting photoelectrons in a number according to a photoelectron number distribution depending upon a number of photons of incident light, multiplying said photoelectrons, and outputting a current signal;

integrating means for integrating said current signal to convert said current signal to a voltage signal and outputting said voltage signal as a pulse height value of one event;

first generating means for collecting a pulse height value of each event and generating a pulse height distribution (N(h); h is pulse height values) of number of event against pulse height value;

second generating means for generating a pulse height distribution of single photoelectron events $(p_1(h))$, based on a pulse height distribution $(N_1(h))$ generated by said first generating means in a collection mode of single photoelectron events in each of which a number of photoelectrons emitted in said photodetector is substantially at most one;

third generating means for recursively calculating values as defined below, based on said pulse height distribution of single photoelectron events $(p_1(h))$, $$p_k(h) = \int_0^h (p_{k-1}(j) \cdot p_1(h-j))dj$$

and thereby generating pulse height distributions of k-photoelectron events $(p_k(h))$ in each of which a number of photoelectrons emitted from said photodetector is k $(2 \leq k \leq k_{max})$; and estimating means for estimating said photoelectron number distribution for a case wherein measurement-object light is incident to said photodetector, based on a pulse height distribution (N(h)) generated by said first generating means when said measurement-object light is incident to said photodetector in a normal measurement mode, said pulse height distribution of single photoelectron events already obtained $(p_1(h))$, and said pulse height distributions of k-photoelectron events already obtained $(p_k(h))$, thereby obtaining an intensity of said measurement-object light.

2. The light measuring apparatus according to claim 1, wherein said photodetector comprises:

a photoelectric conversion surface for emitting photoelectrons in a number according to a photoelectron number distribution depending upon a light quantity of a beam incident thereto;

an avalanche photodiode, between an anode and a cathode of which a reverse bias voltage is applied and a portion of which opposed to said photoelectric conversion surface is set at a higher potential than a potential of said photoelectric conversion surface, for avalanche-multiplying electron-hole pairs generated with incidence of said photoelectrons and outputting said current signal according to a number of electron-hole pairs thus avalanche-multiplied; and a vacuum vessel comprising an entrance window for transmitting said beam and enclosing said photoelectric conversion surface and said avalanche photodiode.

3. The light measuring apparatus according to claim 1, wherein said first generating means comprises:

an analog-digital converter for receiving said voltage signal, converting said voltage signal to a digital value, and outputting the digital signal as a pulse height value; and event counting means for counting and storing a number of events occurring, for each digital value output from said analog-digital converter, and wherein said third generating means calculates values defined below to obtain a pulse height distribution of k-photoelectron events ($p_k(h)$), $$p_k(h) = \sum_{j=0}^{h} (p_{k-1}(j) - p_1(h-j))$$

4. The light measuring apparatus according to claim 1, wherein said estimating means estimates said photoelectron number distribution by maximum likelihood method.

5. The light measuring apparatus according to claim 1, wherein said estimating means estimates said photoelectron number distribution under such an assumption that said photoelectron number distribution is a Poisson distribution.

6. The light measuring apparatus according to claim 1, further comprising light reducing means for reducing a quantity of light incident to said photodetector in reply to a case of setting in a collection mode of single photoelectron events.

7. The light measuring apparatus according to claim 6, wherein said light reducing means comprises a light reducing filter for reducing the intensity of light incident thereto and outputting the light toward said photodetector.

8. The light measuring apparatus according to claim 1, further comprising:

a pulsed light source for outputting pulsed light for irradiating a measurement object and also outputting a generation timing signal of said pulsed light; and operation timing signal generating means for generating an integration instruction signal and a collection instruction signal from said generation timing signal of the pulsed light and for sending said integration instruction signal to said integrating means and said collection instruction signal to said first generating means.

9. The light measuring apparatus according to claim 8, further comprising light reducing means for reducing a quantity of light incident to said photodetector in reply to a case of setting in a collection mode of single photoelectron events.

10. The light measuring apparatus according to claim 9, wherein said light reducing means comprises a light reducing filter for receiving measurement-object light from a measurement object, reducing the intensity of the light, and outputting the light toward said photodetector.

11. The light measuring apparatus according to claim 9, wherein said light reducing means comprises a light reducing filter for receiving the pulsed light output from said pulsed light source, reducing the intensity of the light, and outputting the light toward a measurement object.

12. The light measuring apparatus according to claim 1, further comprising:

said predetermined number of comparing means for comparing said voltage signal of each event with a predetermined number of reference voltages different from each other and outputting a logical pulse signal when said voltage signal is larger than each of predetermined reference voltages; and comparison result counting means for counting logical pulse signals output from each of said predetermined number of comparing means, wherein said estimating means estimates said photoelectron number distribution for the case wherein said measurement-object light is incident to said photodetector, based on the counting results of said comparison result counting means with incidence of the measurement-object light to said photodetector, said pulse height distribution of single photoelectron events already obtained ($p_1(h)$), and said pulse height distributions of k-photoelectron events already obtained ($p_k(h)$).

13. The light measuring apparatus according to claim 1, further comprising measurement control means for giving an instruction of activation of said second generating means in the case of setting in the collection mode of single photoelectron events and giving an instruction of activation of said estimating means in the case of setting in the normal measurement mode.

14. The light measuring apparatus according to claim 13, wherein said measurement control means sends an integration instruction signal to said integrating means and sends a collection instruction signal to said first generating means.

15. The light measuring apparatus according to claim 13, further comprising light reducing means for reducing a quantity of light incident to said photodetector for a case wherein a single photoelectron event instruction signal is significant to effect setting in the collection mode of single photoelectron events, wherein said measurement control means outputs said single photoelectron event instruction signal.

16. The light measuring apparatus according to claim 15, wherein said light reducing means comprises:

a light reducing filter for reducing the intensity of light incident thereto and outputting the light toward said photodetector; and carrying means for locating said light reducing filter at a position where the light to enter said photodetector passes, when said single photoelectron event instruction signal is significant, but removing said light reducing filter from said position where the light to enter said photodetector passes, when said single photoelectron event instruction signal is non-significant.

17. The light measuring apparatus according to claim 13, further comprising:

a pulsed light source for outputting pulsed light for irradiating a measurement object and also outputting a generation timing signal of said pulsed light;

operation timing signal generating means for generating said integration instruction signal and said collection instruction signal from said generation timing signal of the pulsed light and for sending said integration instruction signal to said integrating means and said collection instruction signal to said first generating means; and light reducing means for reducing a quantity of light incident to said photodetector for a case wherein a single photoelectron event instruction signal is significant to effect setting in the collection mode of single photoelectron events, wherein said measurement control means outputs said single photoelectron event instruction signal.

18. The light measuring apparatus according to claim 17, wherein said light reducing means comprises:

a light reducing filter for receiving measurement-object light from a measurement object, reducing the intensity of the light, and outputting the light toward said photodetector; and carrying means for locating said light reducing filter at a position where the light to enter said photodetector passes, when said single photoelectron event instruction signal is significant, but removing said light reducing filter from said position where the light to enter said photodetector passes, when said single photoelectron event instruction signal is non-significant.

19. The light measuring apparatus according to claim 17, wherein said light reducing means comprises:

a light reducing filter for receiving the pulsed light output from said pulsed light source, reducing the intensity of the light, and outputting the light toward the measurement object; and carrying means for locating said light reducing filter at a position where the light output from said pulsed light source passes, when said single photoelectron event instruction signal is significant, but removing said light reducing filter from the position where the light output from said pulsed light source passes, when said single photoelectron event instruction signal is non-significant.

\* \* \* \* \*